US012802273B2

(12) United States Patent
Ye et al.

(10) Patent No.: US 12,802,273 B2
(45) Date of Patent: Nov. 17, 2026

(54) METHODS AND SYSTEMS FOR CORRECTING POSITIONING DEVIATION

(71) Applicant: ZHEJIANG DAHUA TECHNOLOGY CO., LTD., Hangzhou (CN)

(72) Inventors: Yanbin Ye, Hangzhou (CN); Zengfan He, Hangzhou (CN); Chaoping Xia, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 215 days.

(21) Appl. No.: 18/772,231

(22) Filed: Jul. 14, 2024

(65) Prior Publication Data

US 2024/0371039 A1 Nov. 7, 2024

Related U.S. Application Data

(63) Continuation of application No. PCT/CN2023/072083, filed on Jan. 13, 2023.

(30) Foreign Application Priority Data

Jan. 14, 2022 (CN) ......................... 202210046484.8

(51) Int. Cl.
*G06T 7/80* (2017.01)

(52) U.S. Cl.
CPC ...... *G06T 7/80* (2017.01); *G06T 2207/30232* (2013.01); *G06T 2207/30244* (2013.01)

(58) Field of Classification Search
None
See application file for complete search history.

(56) References Cited

U.S. PATENT DOCUMENTS

2011/0149041 A1* 6/2011 Eccles .................. H04N 17/002 348/46
2018/0084239 A1 3/2018 Muller
(Continued)

FOREIGN PATENT DOCUMENTS

CN 104457718 B 11/2017
CN 108051831 A 5/2018
(Continued)

OTHER PUBLICATIONS

International Search Report in PCT/CN2023/072083 mailed on Mar. 22, 2023, 4 pages.
(Continued)

*Primary Examiner* — Molly Wilburn
*Assistant Examiner* — Caroline E. Depalma
(74) *Attorney, Agent, or Firm* — METIS IP LLC

(57) ABSTRACT

The embodiments of the present disclosure provide a method for correcting positioning deviation. The method may include: obtaining geographic position information of at least two geographic reference points; for each of the at least two geographic reference points, obtaining a reference image of the geographic reference point collected by a capture device, wherein the reference image includes image position information of an image reference point corresponding to the geographic reference point; and determining deviation information of the capture device based on the geographic position information and the image position information corresponding to the at least two geographic reference points.

16 Claims, 12 Drawing Sheets

(56) References Cited

U.S. PATENT DOCUMENTS

| | | | |
|---|---|---|---|
| 2018/0307238 | A1 | 10/2018 | Wisniowski |
| 2019/0178436 | A1 | 6/2019 | Mao et al. |
| 2020/0082571 | A1 | 3/2020 | Xie et al. |
| 2021/0042962 | A1 | 2/2021 | Zhang |

FOREIGN PATENT DOCUMENTS

| | | | | | |
|---|---|---|---|---|---|
| CN | 110749311 | A | | 2/2020 | |
| CN | 111260870 | A | | 6/2020 | |
| CN | 111553956 | A | * | 8/2020 | ............... G06T 7/80 |
| CN | 111650968 | A | | 9/2020 | |
| CN | 111750896 | A | | 10/2020 | |
| CN | 112017246 | A | | 12/2020 | |
| CN | 112308903 | A | | 2/2021 | |
| CN | 113506340 | A | | 10/2021 | |
| CN | 113869231 | A | * | 12/2021 | ............... H04N 7/18 |
| CN | 114565677 | A | | 5/2022 | |
| JP | 2002232874 | A | | 8/2002 | |
| WO | 2016195533 | A1 | | 12/2016 | |
| WO | WO-2021138856 | A1 | * | 7/2021 | ............. H04N 23/45 |

OTHER PUBLICATIONS

Written Opinion in PCT/CN2023/072083 mailed on Mar. 22, 2023, 4 pages.

Qiao, Chuan et al., Ground target geo-location using imaging aerial camera with large inclined angles, Optics and Precision Engineering, 25(7): 1714-1726, 2017.

Xu, Sheng, Ground Target Location And Route Design Method Using Fixed-Wing UAV, Chinese excellent master's dissertation full text database Engineering Science and Technology II series, 2016, 75 pages.

David Cabecinhas et al., Integrated Visual Servoing Solution to Quadrotor Stabilization and Attitude Estimation Using a Pan and Tilt Camera, IEEE Transactions on Control Systems Technology, 2019, 16 pages.

Hang Dong et al., Pose Estimation with Correspondences Determination, Proceedings of SPIE, 2018, 11 pages.

Partial Supplementary European Search Report in European Application No. 23740086.6 mailed on Mar. 4, 2025, 18 pages.

The Extended European Search Report in European Application No. 23740086.6 mailed on Jun. 20, 2025, 20 pages.

* cited by examiner

400

1000

1200

METHODS AND SYSTEMS FOR CORRECTING POSITIONING DEVIATION

CROSS-REFERENCE TO RELATED APPLICATIONS

This application is a Continuation of International Application No. PCT/CN2023/072083 filed on Jan. 13, 2023, which claims priority to Chinese Patent Application No. 202210046484.8 filed on Jan. 14, 2022, the entire contents of which are incorporated herein by reference.

TECHNICAL FIELD

This present disclosure relates to the field of positioning technology, and in particular, to methods and systems for correcting positioning deviation.

BACKGROUND

With the development of positioning technology, target monitoring (e.g., forest fire monitoring) is generally realized by setting up a capture device in a target area. However, due to possible errors (e.g., an installation deviation, a deviation caused by long-term use) of the capture device, a deviation may exist in detected positioning information of a target. Therefore, it is desirable to provide methods and system for correcting positioning deviation to improve the positioning accuracy of the target.

SUMMARY

An aspect of the present disclosure provides a method for correcting positioning deviation. The method includes: obtaining geographic position information of at least two geographic reference points; for each of the at least two geographic reference points, obtaining a reference image of the geographic reference point collected by a capture device, wherein the reference image includes image position information of an image reference point corresponding to the geographic reference point; and determining deviation information of the capture device based on the geographic position information and the image position information corresponding to the at least two geographic reference points.

An aspect of the present disclosure provides a system for correcting positioning deviation, the system includes at least one storage device storing instructions; at least one processing device in communication with the at least one storage device, wherein when executing the instructions, the at least one processing device is configured to perform operations including: obtaining geographic position information of at least two geographic reference points; for each of the at least two geographic reference points, obtaining a reference image of the geographic reference point collected by a capture device, wherein the reference image includes image position information of an image reference point corresponding to the geographic reference point; and determine deviation information of the capture device based on the geographic position information and the image position information corresponding to the at least two geographic reference points.

An aspect of the present disclosure provides a system for correcting positioning deviation. The system for correcting positioning deviation includes: an obtaining module, configured to obtain geographic position information of at least two geographic reference points; a determination module, configured to, for each of the at least two geographic reference points, obtain a reference image of the geographic reference point collected by a capture device, wherein the reference image includes image position information of an image reference point corresponding to the geographic reference point; and a correction module, configured to determine deviation information of the capture device based on the geographic position information and the image position information corresponding to the at least two geographic reference points.

An aspect of the present disclosure provides a non-transitory computer-readable storage medium, the storage medium storing computer instructions, wherein when the computer reads the computer instructions, the computer executes a method for correcting positioning deviation, the method comprising: obtaining geographic position information of at least two geographic reference points; for each of the at least two geographic reference points, obtaining a reference image of the geographic reference point collected by a capture device, wherein the reference image includes image position information of an image reference point corresponding to the geographic reference point; and determining deviation information of the capture device based on the geographic position information and the image position information corresponding to the at least two geographic reference points.

An aspect of the present disclosure provides a positioning method. The positioning method includes: obtaining target PTZ attitude information when a capture device captures a target image of a target; obtaining deviation information of the capture device, wherein the deviation information is determined based on geographic position information and image position information corresponding to at least two geographic reference points; and determining target positioning information of the target based on the target PTZ attitude information and the deviation information of the capture device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
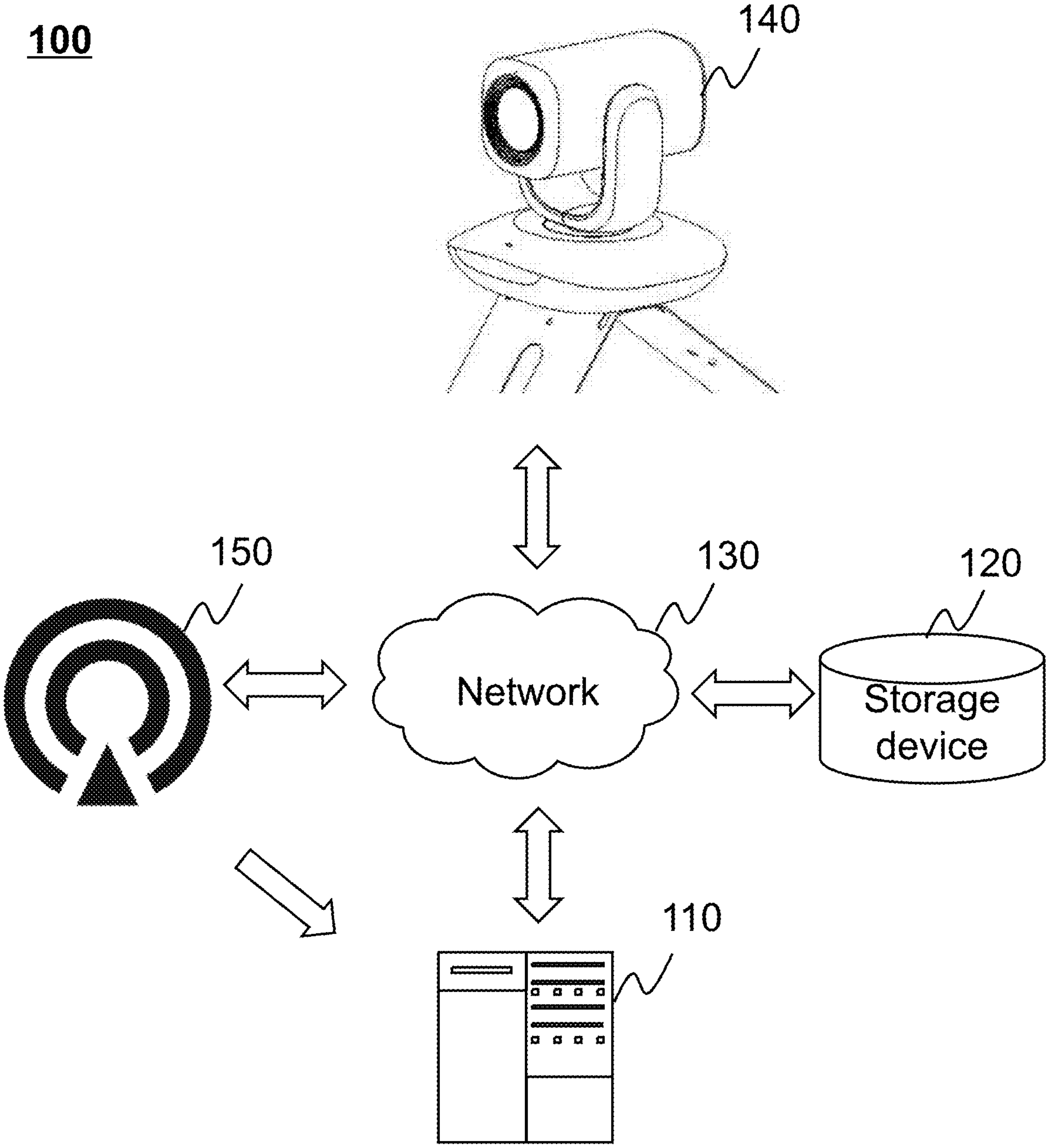
FIG. 1 is a schematic diagram illustrating an exemplary positioning deviation correction system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

An aspect of the present disclosure relates to systems and methods for correcting positioning deviation. The system may obtain geographic position information and image position information (which is obtained based on reference image(s) captured by a capture device) corresponding to at least two geographic reference points. Then the system may determine deviation information of the capture device based on the geographic position information and the image position information. Further, the system may also determine target positioning information of a target based on target Pan-Tilt-Zoom (PTZ) attitude information when the capture device captures a target image of the target and the deviation information of the capture device.

According to the embodiments of the present disclosure, at least two geographic reference points is selected and geographic position information and image position information of the at least two geographic reference points are determined. Accordingly, installation deviation information of the capture device can be accurately determined based on a correspondence between the geographic position information and the image position information, which can provide accurate and reliable data support for subsequent target positioning, thereby improving the positioning efficiency and accuracy.

FIG. 1 is a schematic diagram illustrating an exemplary positioning deviation correction system according to some embodiments of the present disclosure. In some embodiments, the positioning deviation correction system 100 may be applied to various scenarios, such as forest fire prevention, coal mine safety risk detection, environmental protection automatic inspection, urban security, port shipping safety guarantee, etc. As illustrated in FIG. 1, the positioning deviation correction system 100 may include a processing device 110, a storage device 120, a network 130, a monitoring device 140, and a positioning device 150. In some embodiments, the processing device 110, the storage device 120, the monitoring device 140, and the positioning device 150 may be connected to and/or communicate with each other via a wireless connection, a wired connection, or a combination thereof.

The processing device 110 may process data and/or information associated with the positioning deviation correction system 100. For example, the processing device 110 may determine deviation information of a capture device based on geographic position information of at least two geographic reference points and image position information corresponding to the at least two geographic reference points. As another example, the processing device 110 may determine target positioning information of a target based on the deviation information of the capture device and target PTZ attitude information when the capture device captures a target image of the target.

In some embodiments, the processing device 110 may be a single server or a server group. The server group may be centralized or distributed. In some embodiments, the processing device 110 may be local or remote. In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 110 may be implemented on a computing device 200 including one or more components illustrated in FIG. 2 of the present disclosure.

The storage device 120 may store data, instructions, and/or any other information associated with positioning deviation correction. In some embodiments, the storage device 120 may store data obtained from the processing device 110, the monitoring device 140, and/or the positioning device 150. For example, the storage device 120 may store geographic position information and image position information of at least two geographic reference points. As another example, the storage device 120 may store reference PTZ attitude information when a capture device captures reference image(s) of the geographic reference point(s), target PTZ attitude information when the capture device captures a target image of a target, etc. In some embodiments, the storage device 120 may store data and/or instructions that the processing device 110 may execute or use to perform exemplary methods described in the present disclosure.

In some embodiments, the storage device 120 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 120 may be implemented on a cloud platform. In some embodiments, the storage device 120 may be integrated into the processing device 110 and/or the monitoring device 140.

The network 130 may include any suitable network that may facilitate the exchange of information and/or data for the positioning deviation correction system 100. In some embodiments, one or more components (e.g., the processing device 110, the storage device 120, the monitoring device 140, the positioning device 150) of the positioning deviation correction system 100 may communicate information and/or data with one or more other components of the positioning deviation correction system 100 via the network 130. For example, the processing device 110 may obtain the geographic position information and the image position information of the at least two geographic reference points from the storage device 120 via the network 130.

In some embodiments, the network 130 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network (VPN), a satellite network, a telephone network, routers, hubs, switches, server computers, and/or any combination thereof. In some embodiments, the network 130 may include one or more network access points. For example, the network 130 may include wired and/or wireless network access points such as base stations and/or internet exchange points through which one or more components of the positioning deviation correction system 100 may be connected to the network 130 to exchange data and/or information.

The monitoring device 140 may be configured to monitor a target area (e.g., a forest, a mine, natural environment, a security area of a city) or a target in the target area. In some embodiments, the monitoring device 140 may include a capture device, an auxiliary device used for installing the capture device, etc. For example, the capture device may include a camera and a PTZ device, such as a monocular camera, a bifocal PTZ, etc. In some embodiments, the monitoring device 140 may obtain image information of the target area or the target in the target area. In some embodiments, the monitoring device 140 may send the obtained image information to the storage device 120 through the network 130 for storage, or to the processing device 110 for data processing. In some embodiments, the monitoring device 140 may also include a built-in storage device and a processor, which may respectively be configured to store and process images obtained by the capture device.

The positioning device 150 may be configured to locate a target (e.g., a target position) in the target area. The target position may include a forest fire point, an abnormal mine device, a criminal hideout, a ship position in a port, or the like, or a combination thereof. In some embodiments, the positioning device 150 may include, but not limited to, a device capable of positioning, such as a handheld locating device, a handheld locator, a terminal device (e.g., a mobile device, a wearable device), or the like, or a combination thereof.

In some embodiments, the positioning device 150 may communicate with the processing device 110 and/or the storage device 120 through the network 130. For example, the positioning device 150 may send the obtained positioning information in the target area to the storage device 120 through the network 130 for storage. As another example, the positioning device 150 may send the obtained positioning information in the target area to the processing device 110 for processing.

It should be noted that the above description is merely provided for the purposes of illustration, and not intended to limit the scope of the present disclosure. For persons having ordinary skills in the art, plurality of variations and modifications may be made under the teachings of the present disclosure. However, those variations and modifications do not depart from the scope of the present disclosure.

Figure 2:
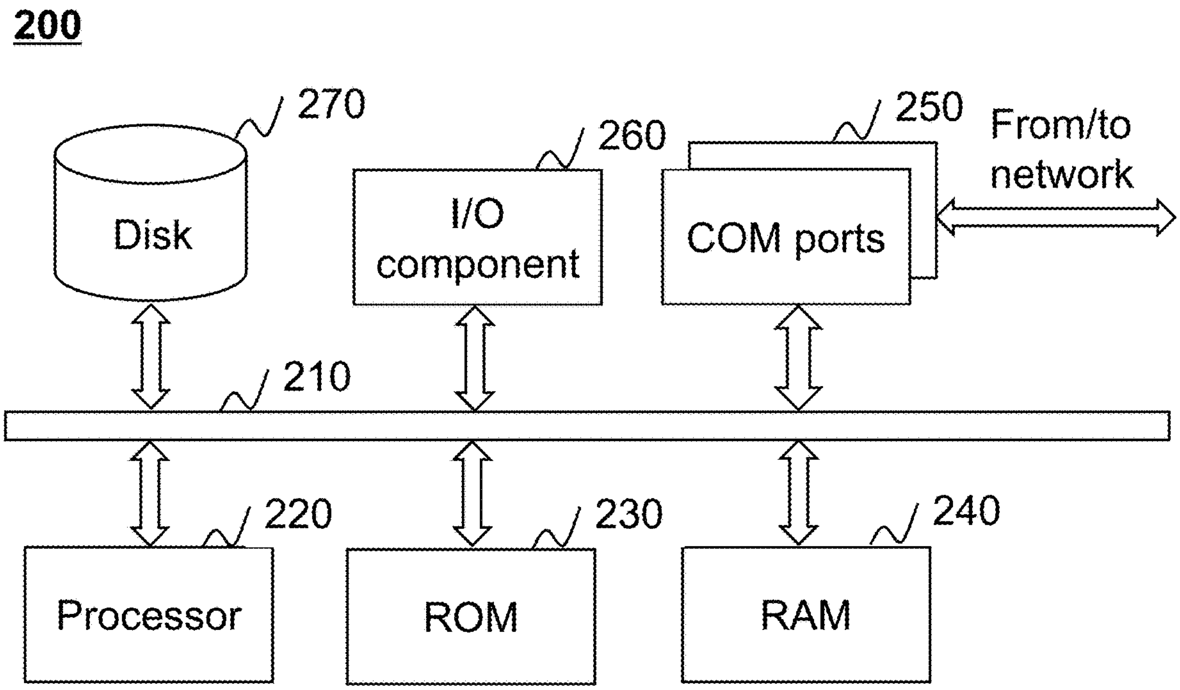
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, one or more components of the positioning deviation correction system 100 may be implemented on the computing device 200. For example, the processing device 110 may be implemented on the computing device 200 and configured to perform functions of the processing device 110 disclosed in this disclosure.

The computing device 200, for example, may include COM ports 250 connected to and from a network connected thereto to facilitate data communications. The computing device 200 may also include a processor 220, in the form of one or more processors, for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may include a program storage and a data storage of different forms, for example, a disk 270, and a read-only memory (ROM) 230, or a random access memory (RAM) 240, for storing various data files to be processed and/or transmitted by the computing device 200. The computing device 200 may also include program instructions stored in the ROM 230, the RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor 220 is described in the computing device 200. However, it should be noted that the computing device 200 in the present disclosure may also include plurality of processors, thus operations and/or method steps that are performed by one processor 220 as described in the present disclosure may also be jointly or separately performed by the plurality of CPUs/processors.

Figure 3:
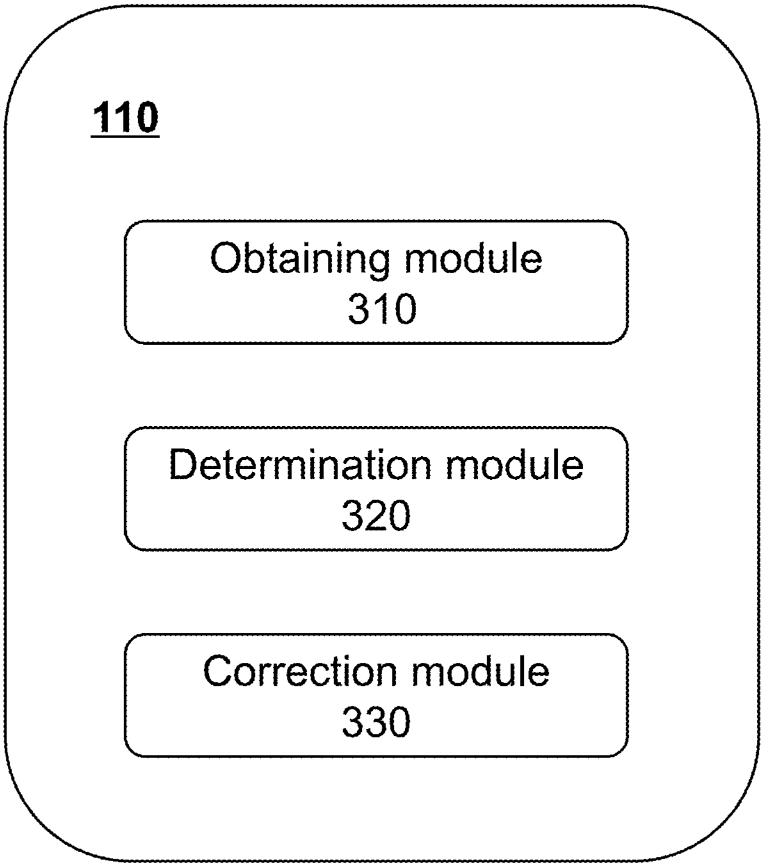
FIG. 3 is a block diagram illustrating an exemplary processing device according to some embodiments of the present disclosure.

FIG. 3 is a block diagram illustrating an exemplary processing device according to some embodiments of the present disclosure. In some embodiments, the processing device 110 may include an obtaining module 310, a determination module 320, and a correction module 330.

The obtaining module 310 may be configured to obtain geographic position information of at least two geographic reference points.

The determination module 320 may be configured to obtain a reference image of the geographic reference point. In some embodiments, for each of the at least two geographic reference points, the determination module 320 may be configured to obtain a reference image of the geographic reference point collected by the capture device, the reference image including image position information of an image reference point corresponding to the geographic reference point.

In some embodiments, when the capture device captures the reference image of the geographic reference point, the image reference point corresponding to the geographic reference point may be located at a center of a capture view of the capture device.

The correction module 330 may be configured to determine deviation information of the capture device. In some embodiments, the correction module 330 may determine the deviation information of the capture device based on the geographic position information and image position information corresponding to the at least two geographic reference points. In some embodiments, the deviation information may include at least one of an angular deviation or a translational deviation.

In some embodiments, for each of the at least two geographic reference points, the correction module 330 may be further configured to obtain reference Pan-Tilt-zoom (PTZ) attitude information corresponding to the reference image, determining the deviation information of the capture device based on the geographic position information corresponding to the at least two geographic reference points, the image position information corresponding to the at least two geographic reference points, and the reference PTZ attitude information. Wherein, the reference PTZ attitude information may include a reference PTZ pitch angle and a reference PTZ yaw angle when the capture device obtains the reference image.

In some embodiments, the correction module 330 may be further configured to construct a geographic position matrix based on the geographic position information; to construct an image position matrix based on the image position information; to construct a PTZ rotation matrix based at least in part on the reference PTZ attitude information; to determine the deviation information of the capture device based on the geographic position matrix, the image position matrix, and the PTZ rotation matrix.

In some embodiments, the correction module 330 may be further configured to construct the PTZ rotation matrix based on the PTZ attitude information and a part of the deviation information; construct a deviation matrix corresponding to the deviation information; solve the deviation information based on the geographic position matrix, the image position matrix, the PTZ rotation matrix, and the deviation matrix. As used herein, the deviation information may at least include an angular deviation, and the angular deviation may include a yaw angle error, a roll angle error, and a pitch angle error.

In some embodiments, the correction module 330 may also be configured to obtain target PTZ attitude information when the capture device obtains a target image of a target; determine target positioning information of the target based on the target PTZ attitude information and the deviation information of the capture device.

In some embodiments, the correction module 330 may be further configured to determine preliminary positioning information of the target based on the target PTZ attitude information and the yaw angle error included in the deviation information; determine the target positioning information of the target based on the preliminary positioning information and the roll angle error and the pitch angle error included in the deviation information.

In some embodiments, the correction module 330 may be further configured to perform a coordinate transformation operation on the preliminary positioning information; obtain corrected positioning information by correcting the transformed preliminary positioning information based on the roll angle error and the pitch angle error; obtain the target positioning information of the target by performing an inverse transformation operation on the corrected positioning information.

In some embodiments, the correction module 330 may be further configured to determine corrected target PTZ attitude information based on the target PTZ attitude information and the deviation information; obtain device positioning information of the capture device; determine a horizontal distance between the target and the capture device; determine the target positioning information of the target based on the device positioning information, the corrected target PTZ attitude information, and the horizontal distance.

Figure 4:
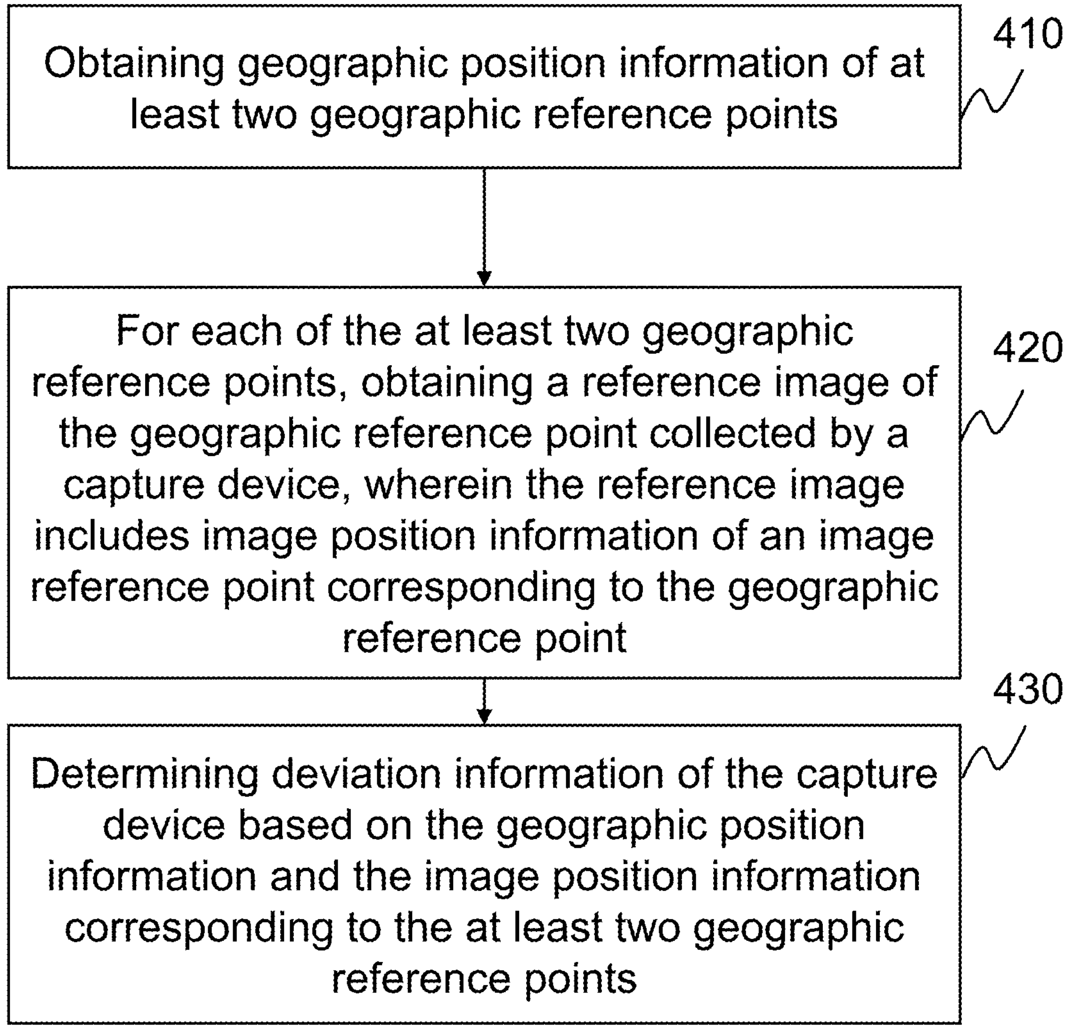
FIG. 4 is a flowchart illustrating an exemplary process for correcting positioning deviation according to some embodiments of the present disclosure.

More detailed descriptions may be found elsewhere in the present disclosure, for example, FIG. 4 and the descriptions thereof.

It should be noted that the above description of the processing device 110 and its modules is only for convenience of description, and cannot limit the present disclosure to the scope of the examples cited. It can be understood that for those skilled in the art, after understanding the principle of the system, it is possible to combine various modules arbitrarily, or form a subsystem to connect with other modules without departing from this principle. In some embodiments, the obtaining module 310, the determination module 320, and the correction module 330 may be different modules in one system, or one module may realize the functions of the above-mentioned two or more modules. For example, each module may share one storage module, or each module may have its own storage module. Variations such as these are within the scope of protection of the present disclosure.

FIG. 4 is a flowchart illustrating an exemplary process for correcting positioning deviation according to some embodiments of the present disclosure. In some embodiments, process 400 may be executed by the positioning deviation correction system 100. For example, the process 400 may be implemented as a set of instructions stored in the storage device (e.g., the storage device 120). In some embodiments, the processing device 110 (e.g., the processor 220 of the computing device 200 and/or one or more modules illustrated in FIG. 3) may execute the set of instructions and may accordingly be directed to perform the process 400. The operations of the illustrated process presented below are intended to be illustrative. In some embodiments, the process 400 may be accomplished with one or more additional operations not described and/or without one or more of the operations discussed. Additionally, the order of the operations of process 400 illustrated in FIG. 3 and described below is not intended to be limiting.

In 410, the processing device 110 (e.g., the obtaining module 310, processor 220) may obtain geographic position information of at least two geographic reference points.

The geographic reference point may refer to a position point in geographic reality and used for reference for positioning. In some embodiments, the at least two geographic reference points may be manually determined or determined by the processing device 110. Merely by way of example, the processing device 110 may determine at least two reference points (also referred to as a "marking point" or a "calibration point") in a capture view of a capture device (e.g., the capture device of the monitoring device 140) based on a user instruction. Further, the processing device 110 may determine at least two position points in the geographic reality corresponding to the at least two reference points as the at least two geographic reference points.

Figure 5:
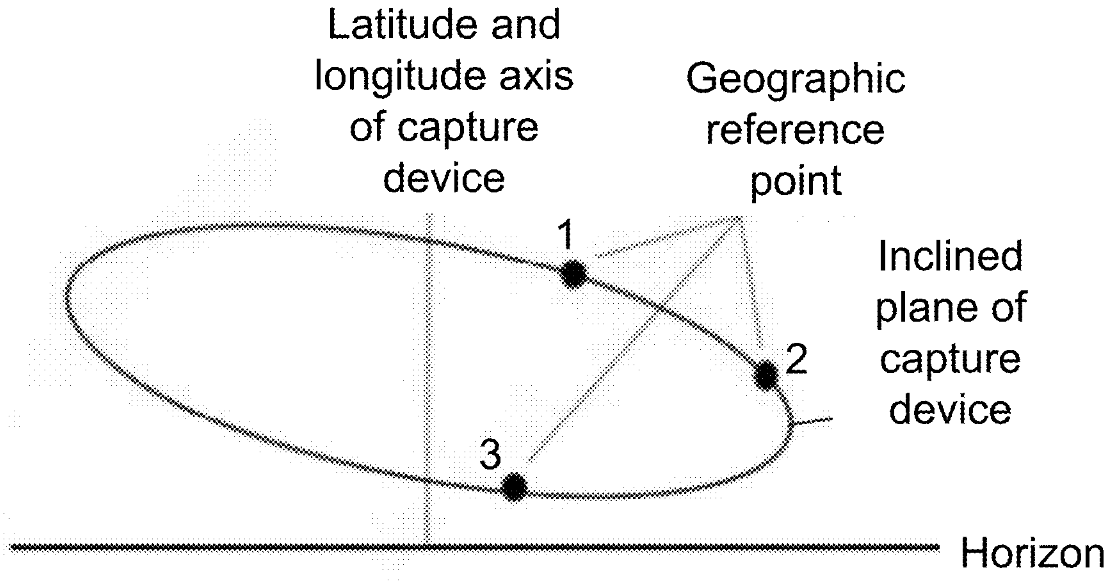
FIG. 5 is a schematic diagram illustrating exemplary geographic reference points according to some embodiments of the present disclosure.

In some embodiments, the at least two geographic reference points may be relatively easily accessible positions in the geographic reality. In some embodiments, a distance among the at least two geographic reference points may be greater than a preset distance threshold (which may be a default value of the positioning deviation correction system 100, or may be set by a user). In some embodiments, the at least two geographic reference points may be located on a same straight line. In some embodiments, the at least two geographic reference points may be located on different lines. For example, as shown in FIG. 5, geographic reference point 1, geographic reference point 2, and geographic reference point 3 are located on different straight lines. It should be noted that FIG. 5 is a schematic diagram illustrating three geographic reference points and a plane where the capture device is located. As shown in FIG. 5, due to installation error of the capture device, the plane where the capture device is located may be a plane that is inclined relative to the horizontal plane. Accordingly, when the capture device captures image(s) of the three geographic reference points, the three geographic reference points may be located on the inclined plane where the capture device is located. In fact, it should be understood that the three geographic reference points are actually located on the ground plane in the geographic reality.

The geographic position information may refer to positioning information of an actual position point in the geographic reality. In some embodiments, the geographic position information may be represented by longitude, latitude, and altitude. For example, geographic position information of an i-th geographic reference point may be expressed as $rp(long_i, lat_i, alti_i)$, wherein $long_i$ represents longitude information of the i-th geographic reference point, $lat_i$ represents latitude information of the i-th geographic reference point, and $alti_i$ represents altitude information of the i-th geographic reference point.

In some embodiments, the geographic position information may include GPS positioning information, satellite positioning information, or the like, or a combination thereof. In some embodiments, the processing device 110 may obtain the geographic position information of the geographic reference point through GPS positioning, satellite remote sensing technology, or the like, or a combination thereof. In some embodiments, the processing device 110 may obtain the geographic position information of the at least two geographic reference points from the positioning device 150 (e.g., a handheld locating device, a handheld locator, a mobile device). For example, the positioning device 150 may be located at a geographic reference point and send corresponding positioning information to the processing device 110.

In some embodiments, the processing device 110 may determine the geographic position information of the at least two geographic reference points according to a positioning model.

In some embodiments, the positioning model may include a machine learning model, for example, a neural network model. For example, the neural network model may include a convolutional neural network (CNN), a deep neural network (DNN), or the like, or any combination thereof.

In some embodiments, take a specific geographic reference point as an example, an input of the positioning model may include initial positioning information (e.g., positioning information obtained from the positioning device 150) of the geographic reference point and a vegetation coverage rate of the geographic reference point; an output of the positioning model may include the geographic position information of the geographic reference point. In some embodiments, the vegetation coverage rate may indicate an extent to which the geographic reference point is covered by vegetation, which may be obtained based on satellite images, images taken by drones, etc.

In some embodiments, the positioning model may be obtained through training based on a plurality of first training samples. In some embodiments, the first training sample may include a sample vegetation coverage rate and sample initial positioning information of a sample geographic reference point. A corresponding first label may include actual geographic position information of the sample geographic reference point.

In some embodiments, the positioning model may be trained iteratively until a termination condition is satisfied. In response to that the termination condition is satisfied, the positioning model may be finalized. In some embodiments, the termination condition may relate to a value of a loss function. For example, the termination condition may be deemed satisfied if the value of the loss function is minimal or smaller than a predetermined threshold. As another example, the termination condition may be deemed satisfied if the value of the loss function converges. In some embodiments, "convergence" may refer to that the variation of the values of the loss function in two or more consecutive iterations is equal to or smaller than a predetermined threshold. In some embodiments, "convergence" may refer to that a difference between the value of the loss function and a target value is equal to or smaller than a predetermined threshold. In some embodiments, the termination condition may be deemed satisfied when a specified count of iterations have been performed in the training process.

According to the embodiments of the present disclosure, the initial geographic position information of the geographic reference point is corrected or processed through a positioning model, which can fully consider various factors (e.g., the vegetation coverage rate) that may cause positioning deviations and improve positioning accuracy.

In 420, for each of the at least two geographic reference points, the processing device 110 (e.g., the determination module 320, processor 220) may obtain a reference image of the geographic reference point collected by the capture device.

In some embodiments, the reference image may include image position information of an image reference point corresponding to the geographic reference point.

The image reference point (also referred to as a "marking point" or "calibration point") may refer to a corresponding position point of the geographic reference point in a capture view of the capture device. Accordingly, the reference image may refer to an image including the geographic reference point collected by the capture device. In some embodiments, the processing device 110 may control the capture device to perform a capture operation on the geographic reference point and obtain a reference image of the geographic reference point.

In some embodiments, when the capture device captures the reference image of the geographic reference point, the image reference point corresponding to the geographic reference point may be located at a center of the capture view of the capture device. For example, when the capture device performs a capture operation on the geographic reference point, the PTZ where the capture device is located may be rotated to a certain position, so that the image reference point corresponding to the geographic reference point may be located at the center of the capture view of the capture device.

The image position information may refer to position information (e.g., coordinate) of the image reference point in the reference image. In some embodiments, the processing device 110 may establish an image coordinate system based on the reference image and determine the image position information of the image reference point based on the image coordinate system.

In some embodiments, the processing device 110 may define a vertex at an upper left corner of the reference image as a coordinate origin, a line pointing to an upper right corner of the image as a horizontal axis (i.e., x-axis), and a line pointing to a lower left corner of the image as a vertical axis (i.e., y-axis) to establish a Cartesian coordinate system. Further, the processing device 110 may determine a position of the image reference point in the established Cartesian coordinate system as the image position information of the image reference point. For example, image position information of an i-th image reference point corresponding to an i-th geographic reference point may be expressed as $(u_i, v_i)$, wherein $u_i$ represents an x coordinate value of the i-th image reference point and $v_i$ represents a y coordinate value of the i-th image reference point.

In 430, the processing device 110 (e.g., the correction module 330, processor 220) may determine deviation information of the capture device based on the geographic position information corresponding to the at least two geographic reference points and image position information corresponding to the at least two geographic reference points.

As described in connection with FIG. 5, due to the installation error of the capture device, there may be a certain inclination between the capture device and the horizontal plane, so that the plane where the capture device is located may be an inclined plane that is inclined relative to the horizontal plane, which may lead to that an obtained installation angle of the capture device may have a certain deviation (which may be equivalent to a deviation between the inclined plane and the horizontal plane and/or the true north direction) relative to the horizontal plane. Accordingly, the deviation information of the capture device may reflect an installation deviation of the capture device with reference to the horizontal plane (or the horizontal line) and/or the true north direction.

In some embodiments, the deviation information may include at least one of an angular deviation or a translational deviation.

The translation deviation may refer to a translation amount of an installation position of the capture device relative to the geocentric coordinate system. For example, the translation deviation T can be expressed as $$\begin{bmatrix} T_X \\ T_Y \\ T_Z \end{bmatrix},$$

wherein $T_X$, $T_Y$, and $T_Z$ respectively represent a translation amount of the installation position of the capture device along X axis, Y axis, and Z axis in the geocentric coordinate system relative to the geocentric origin.

The angular deviation may refer to a deviation associated with an installation angle of the capture device. For example, the angular deviation may include a pitch angle error, a yaw angle error, a roll angle error, or the like, or a combination thereof. More descriptions of the angular deviation may be found elsewhere in the present disclosure, for example, FIG. 8 and the descriptions thereof.

In some embodiments, the processing device 110 may determine the deviation information of the capture device based on the geographic position information of the at least two geographic reference points, the image position information corresponding to the at least two geographic reference points, PTZ attitude information, etc. Specifically, the processing device 110 may determine the pitch angle error, the yaw angle error, and the roll angle error based on the geographic position information of the at least two geographic reference points, the image position information corresponding to the at least two geographic reference points, and the PTZ attitude information.

In some embodiments, for each geographic reference point, the processing device 110 may obtain reference PTZ attitude information corresponding to a reference image of the geographic reference point. Further, the processing device 110 may determine the deviation information of the capture device based on the geographic position information corresponding to the at least two geographic reference points, the image position information corresponding to the at least two geographic reference points, and the reference PTZ attitude information corresponding to the at least two geographic reference points. In some embodiments, the processing device 110 may determine the deviation information of the capture device based on the geographic position information, the image position information, and the reference PTZ attitude information according to a camera pinhole imaging model. More descriptions may be found elsewhere in the present disclosure, for example, FIG. 6, FIG. 8, and related descriptions thereof.

In some embodiments, the processing device 110 may determine target positioning information of a target based on the deviation information. More descriptions may be found elsewhere in the present disclosure, for example, FIG. 9, FIG. 10, and related descriptions thereof.

According to some embodiments of the present disclosure, at least two geographic reference points is selected and geographic position information and image position information of the at least two geographic reference points are determined. Accordingly, installation deviation information of the capture device can be accurately determined based on a correspondence between the geographic position information and the image position information, which can provide accurate and reliable data support for subsequent target positioning, thereby improving the positioning efficiency and accuracy.

It should be noted that the above description is merely provided for the purposes of illustration, and not intended to limit the scope of the present disclosure. For persons having ordinary skills in the art, plurality of variations or modifications may be made under the teachings of the present disclosure. However, those variations and modifications do not depart from the scope of the present disclosure. For example, one or more other optional operations (e.g., a storing operation) may be added elsewhere in the process 400. In the storing operation, the processing device 110 may store information and/or data (e.g., the deviation information) associated with positioning deviation correction in a storage device (e.g., the storage device 120) disclosed elsewhere in the present disclosure. In some embodiments, at least one geographic reference point is used for the purpose of correcting positioning deviation. The processing device 110 may obtain geographic position information and image information of the at least one geographic reference point, and determine deviation information of the capture device based on the geographic position information corresponding to the at least one geographic reference point and the image position information corresponding to the at least one geographic reference point.

Figure 6:
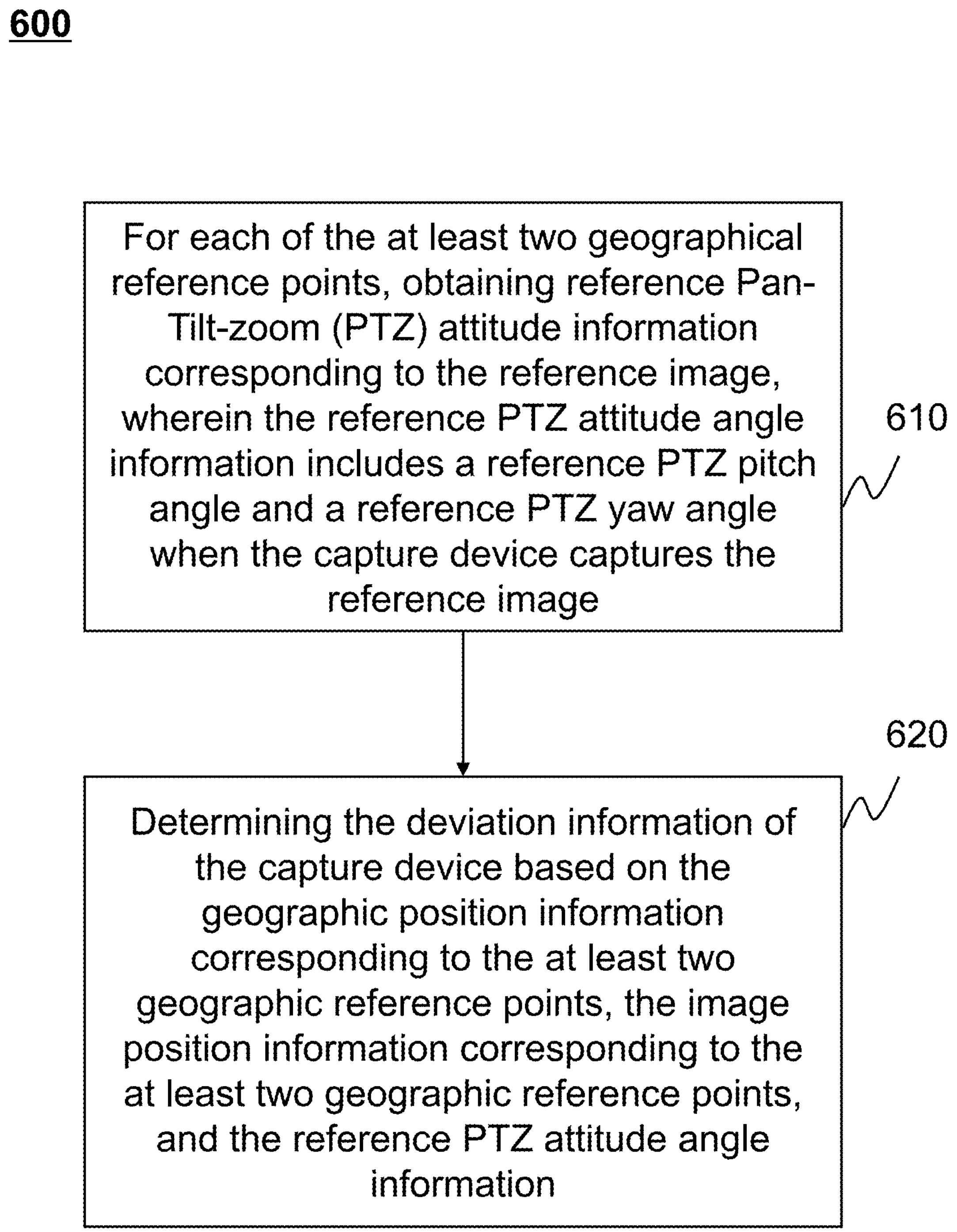
FIG. 6 is a flowchart illustrating an exemplary process for determining deviation information of a capture device according to some embodiments of the present disclosure.

FIG. 6 is a flowchart illustrating an exemplary process for determining deviation information of a capture device according to some embodiments of the present disclosure. In some embodiments, process 600 may be executed by the positioning deviation correction system 100. For example, the process 600 may be implemented as a set of instructions stored in the storage device (e.g., the storage device 120). In some embodiments, the processing device 110 (e.g., the processor 220 of the computing device 200 and/or one or more modules illustrated in FIG. 3) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, operation 430 may be performed based on process 600.

In 610, for each of the at least two geographic reference points, the processing device 110 (e.g., the correction module 330, processor 220) may obtain reference PTZ attitude information corresponding to a reference image of the geographic reference point.

In some embodiments, the reference PTZ attitude information may include a reference PTZ pitch angle and a reference PTZ yaw angle when the capture device captures the reference image.

The PTZ pitch angle may refer to an included angle between the PTZ body and the horizontal plane. The PTZ yaw angle may refer to an included angle of the actual direction of the PTZ on the vertical plane and the true north direction.

In some embodiments, the processing device 110 may record an angle (the PTZ pitch angle and the PTZ yaw angle) of the PTZ when the capture device performs a capture operation on the geographic reference point and accordingly obtain the reference PTZ attitude information. In some embodiments, the processing device 110 may determine theoretical PTZ attitude information when the capture device performs a capture operation on the geographic reference point based on device information (e.g., altitude information of the capture device relative to the ground, latitude and longitude information of an installation position of the capture device) of the capture device and a digital elevation model (DEM), and designate the theoretical PTZ attitude information as the reference PTZ attitude information.

Figure 7:
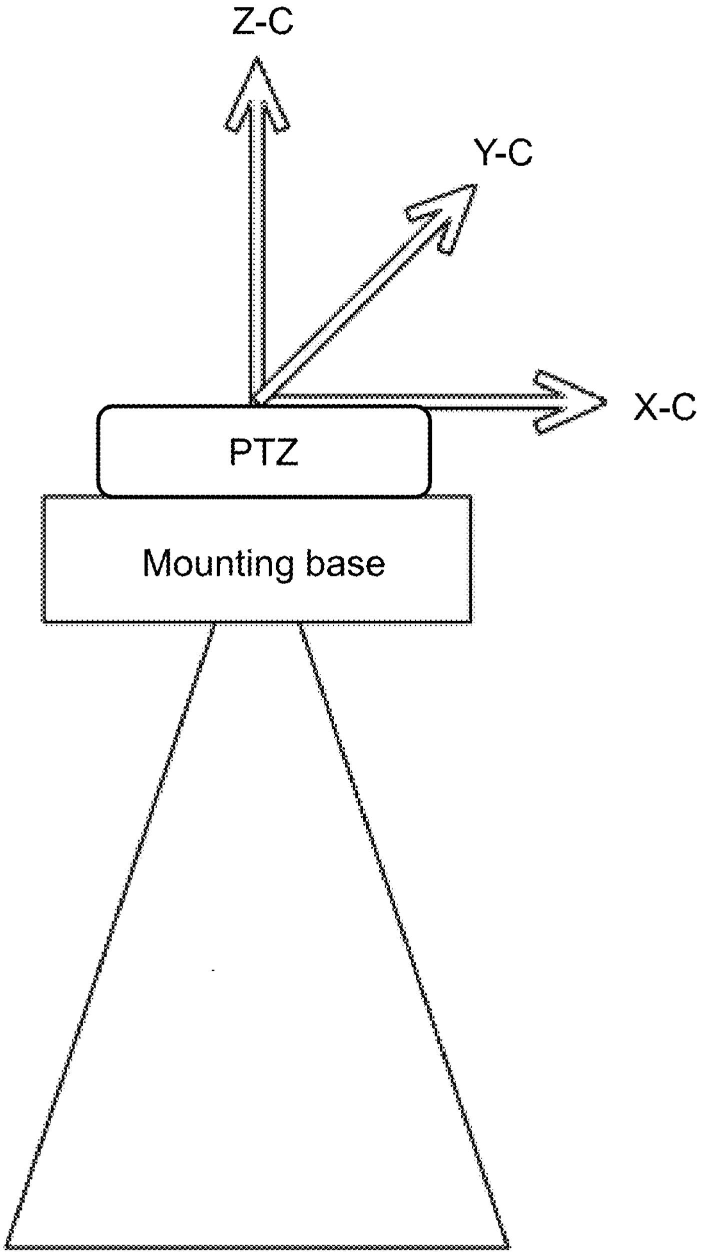
FIG. 7 is a schematic diagram illustrating an exemplary Pan-Tilt-Zoom (PTZ) reference coordinate system according to some embodiments of the present disclosure.

In some embodiments, the reference PTZ attitude information may be expressed as $R_{yuntai}$ ($pitch_{yuntai}$, $yaw_{yuntai}$), wherein $pitch_{yuntai}$ represents the PTZ pitch angle and $yaw_{yuntai}$ represents the PTZ yaw angle. Merely by way of example, as shown in FIG. 7, the processing device 110 may construct a PTZ coordinate system, wherein an X_C axis in the PTZ coordinate system represents a direction indicated by the PTZ pitch angle $pitch_{yuntai}=0$, a Y_C axis indicates a direction indicated by the PTZ yaw angle $yaw_{yuntai}=0$, and a Z_C axis indicates a direction of a vertical line perpendicular to an installation plane of the PTZ. Accordingly, the processing device 110 may determine the reference PTZ attitude information $R_{yuntai}$ based on the PTZ coordinate system.

In some embodiments, the processing device 110 may also obtain a field angle (e.g., a horizontal field angle, a vertical field angle) of the capture device, a resolution (e.g., a horizontal resolution, a vertical resolution) of the capture device, etc.

In 620, the processing device 110 (e.g., the correction module 330, the processor 220) may determine the deviation information of the capture device based on the geographic position information, the image position information, and the reference PTZ attitude information corresponding to at least two geographic reference points.

In some embodiments, the processing device 110 may determine the deviation information of the capture device based on the geographic position information, the image position information, and the reference PTZ attitude information corresponding to at least two geographic reference points according to a preset process. In some embodiments, the preset process may include a coordinate transformation, a matrix construction, a matrix solution, or the like, or a combination thereof.

In some embodiments, the processing device 110 may determine the deviation information of the capture device based on the geographic position information, the image position information, and the reference PTZ attitude information corresponding to at least two geographic reference points, and installation information (e.g., an installation position) of the capture device according to a digital elevation model (DEM).

In some embodiments, the processing device 110 may construct a geographic position matrix based on the geographic position information; construct an image position matrix based on the image position information; construct a PTZ rotation matrix based at least in part on the reference PTZ attitude information; and determine the deviation information of the capture device based on the geographic position matrix, the image position matrix, and the PTZ rotation matrix. More descriptions may be found elsewhere in the present disclosure, for example, FIG. 8 and related descriptions thereof.

According to some embodiments of the present disclosure, the installation deviation information of the capture device may be determined based on the reference PTZ attitude information (e.g., a reference PTZ pitch angle, a reference PTZ yaw angle) when the capture device performs a capture operation on the at least two geographic reference points and the geographic position information and the image position information corresponding to the at least two geographic reference points, which can improve positioning efficiency and accuracy.

It should be noted that the above description is merely provided for the purposes of illustration, and not intended to limit the scope of the present disclosure. For persons having ordinary skills in the art, plurality of variations or modifications may be made under the teachings of the present disclosure. However, those variations and modifications do not depart from the scope of the present disclosure.

Figure 8:
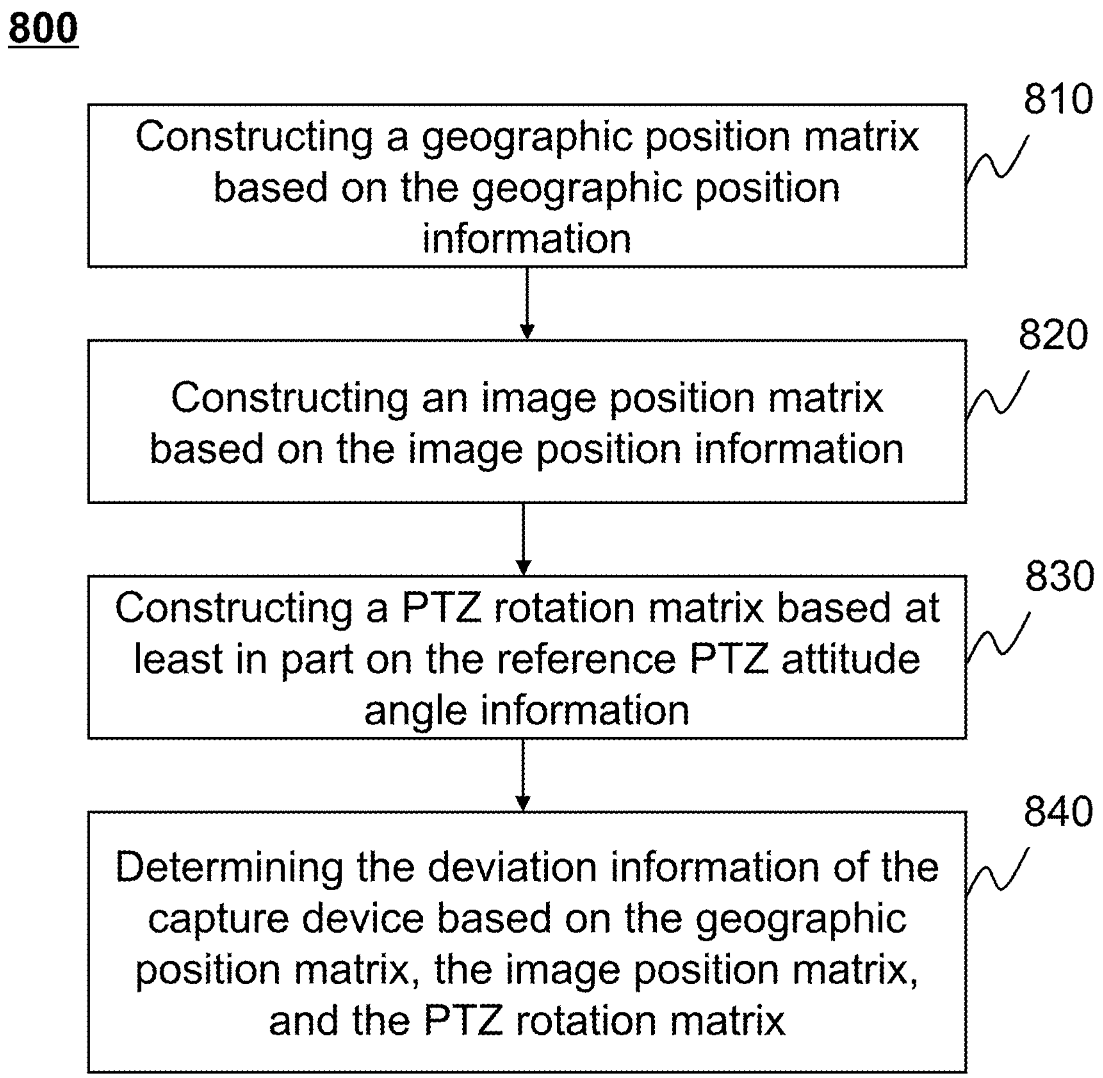
FIG. 8 is a flowchart illustrating an exemplary process for determining deviation information of a capture device according to other embodiments of the present disclosure.

FIG. 8 is a flowchart illustrating an exemplary process for determining deviation information of a capture device according to other embodiments of the present disclosure. In some embodiments, process 800 may be executed by the positioning deviation correction system 100. For example, the process 800 may be implemented as a set of instructions stored in the storage device (e.g., the storage device 120). In some embodiments, the processing device 110 (e.g., the processor 220 of the computing device 200 and/or one or more modules illustrated in FIG. 3) may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting. In some embodiments, operation 620 may be performed based on the process 800.

In 810, the processing device 110 (e.g., the correction module 330, the processor 220) may construct a geographic position matrix based on the geographic position information.

The geographic position matrix may refer to a collection of geographic position information of the geographic reference point(s). In some embodiments, the processing device 110 may construct a geographic position matrix with different coordinate axes as rows based on the geographic position information of the geographic reference point(s). In some embodiments, the processing device 110 may transform coordinates corresponding to the geographic position information into coordinates under the geocentric coordinate system, and then construct the geographic position matrix based on the coordinates under the geocentric coordinate system. For example, the processing device 110 may convert the coordinates of the geographic position information into coordinates under the geocentric coordinate system according to formula (1) and formula (2) below:

$$\begin{cases} X_E = (N+H)\times\cos B\times\cos L \\ Y_E = (N+H)\times\cos B\times\cos L \\ Z_E = \left[N\left(1-E^2\right)+H\right]\times\sin B \end{cases} \tag{1}$$

$$\begin{cases} E = \dfrac{\sqrt{a^2-b^2}}{a} \\ N = \dfrac{a}{\sqrt{1-E^2\times\sin^2 B}} \end{cases} \tag{2}$$

where the geocentric coordinate system is a space Cartesian coordinate system established with the earth's barycenter as the origin, or a geodetic coordinate system established with the earth's ellipsoid (with a center coinciding with the earth's barycenter) as the reference plane; B represents latitude, L represents longitude, H represents height (a sum of an altitude of a position where a target is located and a height of the target); N represents a curvature radius of the ellipsoid, E represents a eccentricity of the ellipsoid; a represents the major axis radius of the earth; b represents the minor axis radius of the earth; and $(X_E, Y_E, Z_E)$ represents a coordinate under the geocentric coordinate system.

Further, the geographic position matrix constructed based on the geographic position information may be expressed as below:

$$\begin{bmatrix} X_{rp}^i \\ Y_{rp}^i \\ Z_{rp}^i \\ 1 \end{bmatrix} \tag{3}$$

where $$\left(X_{rp}^i, Y_{rp}^i, Z_{rp}^i\right)$$

represents a coordinate of an i-th geographic reference point under the geocentric coordinate system.

In 820, the processing device 110 (e.g., the correction module 330, the processor 220) may construct an image position matrix based on the image position information.

The image position matrix may refer to a collection of the image position information. In some embodiments, the image position matrix constructed based on the image position information may be expressed as below:

$$\begin{bmatrix} u_i \\ v_i \\ 1 \end{bmatrix} \tag{4}$$

where $u_i$ represents an x coordinate value of the i-th image reference point and $v_i$ represents a y coordinate value of the i-th image reference point.

In 830, the processing device 110 (e.g., the correction module 330, the processor 220) may construct a PTZ rotation matrix based at least in part on the reference PTZ attitude information.

The PTZ rotation matrix may refer to a collection formed based on the PTZ attitude information. In some embodiments, the processing device 110 may convert the reference PTZ attitude information according to a trigonometric function relationship and construct the PTZ rotation matrix based on the converted reference PTZ attitude information. More detailed descriptions may be provided below.

In 840, the processing device 110 (e.g., the correction module 330, the processor 220) may determine the deviation information of the capture device based on the geographic position matrix, the image position matrix, and the PTZ rotation matrix.

In some embodiments, the deviation information may at least include an angular deviation (e.g., the yaw angle error, the roll angle error, the pitch angle error).

The pitch angle error may refer to an angle error of the PTZ deviating from the horizontal plane when the capture device is installed. For example, as shown in FIG. 7, the pitch angle error may refer to an angle between a direction (e.g., a central axis) of the PTZ after the PTZ is rotated around the X_C axis and the horizontal plane.

The yaw angle error may refer to a rotation angle error around a direction (gravity direction) vertical to the horizontal plane when the capture device is installed. For example, as shown in FIG. 7, the yaw angle error may refer to an included angle between a direction (e.g., a central axis) of the PTZ after the PTZ is rotated around the Z_C axis and the true north direction.

The roll angle error may refer to a rotation angle error around a central axis of the mounting base where the PTZ is installed when the capture device is installed. For example, as shown in FIG. 7, the roll angle error may refer to an angle between a direction (e.g., a central axis) of the PTZ and the horizontal plane after the capture device is installed and rotated around the Y_C axis.

In some embodiments, the processing device 110 may construct the PTZ rotation matrix based on the PTZ attitude information and a part (e.g., the yaw angle error) of the deviation information.

In some embodiments, the processing device 110 may construct the PTZ rotation matrix based on the PTZ attitude information and a yaw angle error included in the deviation information. For example, the processing device 110 may convert the PTZ attitude information and the yaw angle error according to a trigonometric function relationship and construct the PTZ rotation matrix based on the converted information thereof according to formula (5) below:

$$R_{yun} = \begin{bmatrix} 1 & 0 & 0 \\ 0 & \cos(\text{pitch}_{yuntai}) & -\sin(\text{pitch}_{yuntai}) \\ 0 & \sin(\text{pitch}_{yuntai}) & \cos(\text{pitch}_{yuntai}) \end{bmatrix} * \begin{bmatrix} \cos(\text{yaw}) & -\sin(\text{yaw}) & 0 \\ \sin(\text{yaw}) & \cos(\text{yaw}) & 0 \\ 0 & 0 & 1 \end{bmatrix} * \begin{bmatrix} \cos(\text{yaw}_{yuntai}) & -\sin(\text{yaw}_{yuntai}) & 0 \\ \sin(\text{yaw}_{yuntai}) & \cos(\text{yaw}_{yuntai}) & 0 \\ 0 & 0 & 1 \end{bmatrix} \quad (5)$$

where $R_{yun}$ represents the PTZ rotation matrix, $\text{pitch}_{yuntai}$ represents the PTZ pitch angle, $\text{yaw}_{yuntai}$ represents the PTZ yaw angle, and yaw represents the yaw angle error in the deviation information.

In some embodiments, the processing device 110 may construct a deviation matrix corresponding to the deviation information. The deviation matrix may refer to a collection of the deviation information.

In some embodiments, the processing device 110 may convert the angular deviation in the deviation information according to a trigonometric function relationship and construct the deviation matrix based on the converted angular deviation. For example, the processing device 110 may construct the deviation matrix $R_{camera}$ according to formula (6) below:

$$R_{camera} = \begin{bmatrix} 1 & 0 & 0 \\ 0 & \cos(\text{pitch}) & -\sin(\text{pitch}) \\ 0 & \sin(\text{pitch}) & \cos(\text{pitch}) \end{bmatrix} * \begin{bmatrix} \cos(\text{roll}) & 0 & \sin(\text{roll}) \\ 0 & 1 & 0 \\ -\sin(\text{roll}) & 0 & \cos(\text{roll}) \end{bmatrix} \quad (6)$$

where $R_{camera}$ represents the deviation matrix, pitch represents to the pitch angle error, roll represents the roll angle error.

In some embodiments, the processing device 110 may determine the deviation information based on the geographic position matrix, the image position matrix, the PTZ rotation matrix, and the deviation matrix.

In some embodiments, the processing device 110 may determine the deviation information of the capture device based on the geographic position matrix, the image position matrix, and the PTZ rotation matrix, in combination with device parameter(s) and/or installation position information (e.g., the translation deviation) of the capture device.

In some embodiments, the device parameter(s) of the capture device may include a focal length (e.g., a horizontal focal length, a vertical focal length) of the capture device, coordinates of a lens optical center, a scale factor used for calibration, or the like, or any combination thereof.

In some embodiments, the processing device 110 may obtain the horizontal focal length and the vertical focal length of the capture device directly from factory parameters. In some embodiments, the processing device 110 may obtain the horizontal focal length and the vertical focal length of the capture device based on the factory parameters. For example, the processing device 110 may obtain the horizontal focal length and the vertical focal length of the capture device according to formula (7) and formula (8) below:

$$f_x = \frac{\text{resolution}_x}{2} / \tan(fov_x/2) \quad (7)$$

$$f_y = \frac{\text{resolution}_y}{2} / \tan(fov_y/2) \quad (8)$$

where $f_x$ represents a horizontal focal length of the capture device; $f_y$ represents a vertical focal length of the capture device; $\text{resolution}_x$ represents a horizontal resolution of the capture device; $\text{resolution}_y$ represents a vertical resolution of the capture device.

In some embodiments, the processing device 110 may obtain the coordinates of the lens optical center based on a center point of an image captured by the capture device. For example, the processing device 110 may directly designate the center point of the image as the lens optical center. As another example, the processing device 110 may determine the coordinates of the lens optical center according to formula (9) and formula (10) below:

$$u_0 = \text{resolution}_x/2 \quad (9)$$

$$v_0 = \text{resolution}_y/2 \quad (10)$$

where $u_0$ and $v_0$ represent the coordinates of the lens optical center.

In some embodiments, the processing device 110 may construct a device parameter matrix based on the device parameter(s) of the capture device. For example, the device parameter matrix may be expressed as below:

$$\begin{bmatrix} f_x & 0 & u_0 \\ 0 & f_y & v_0 \\ 0 & 0 & 1 \end{bmatrix} \tag{11}$$

In In some embodiments, the processing device 110 may construct a rotation matrix based on the PTZ rotation matrix and the deviation matrix. For example, the constructed rotation matrix may be expressed as below:

$$R = R_{yun} * R_{camera} \tag{12}$$

where R represents the rotation matrix.

In some embodiments, the processing device 110 may then construct an installation deviation matrix based on the rotation matrix and the translation deviation of the capture device. For example, the constructed installation deviation matrix may be expressed as below:

$$\begin{bmatrix} R & T \\ 0 & 1 \end{bmatrix} \tag{13}$$

Further, the processing device 110 may construct a camera pinhole imaging model based on the geographic position matrix, the image position matrix, the PTZ rotation matrix, the deviation matrix, the device parameter matrix, and the installation deviation matrix. Furthermore, the processing device 110 may solve the deviation information based on the camera pinhole imaging model.

In some embodiments, the processing device 110 may construct the camera pinhole imaging model according to formula (14) below:

$$s\begin{bmatrix} u_i \\ v_i \\ 1 \end{bmatrix} = \begin{bmatrix} f_x & 0 & u_0 \\ 0 & f_y & v_0 \\ 0 & 0 & 1 \end{bmatrix}\begin{bmatrix} R & T \\ 0 & 1 \end{bmatrix}\begin{bmatrix} X_{rp}^i \\ Y_{rp}^i \\ Z_{rp}^i \\ 1 \end{bmatrix} \tag{14}$$

where s represents the scale factor which is a non-zero coefficient and can be removed by elimination during the solving process.

In the above pinhole imaging model, the yaw angle error, the pitch angle error, and the roll angle error in R and $T_X$, $T_Y$, and $T_Z$ in the translation deviation T are unknown (i.e., there are six unknown parameters or values). Accordingly, at least three geographic reference points are needed (accordingly, six solution equations can be constructed) to obtain the deviation information of the capture device.

In some embodiments, the processing device 110 may determine the translation deviation T based on the installation position information of the capture device. Accordingly, there are three unknown parameters or values in the above pinhole imaging model and at least two geographic reference points can achieve the solving of the deviation information.

In some embodiments, as described in connection with operation 430, the processing device 110 may convert the installation position (which may be obtained through a positioning device (e.g., the positioning device) provided with the capture device) of the capture device to coordinates under the geocentric coordinate system, designate the coordinates as the translation amounts (i.e., $T_X$, $T_Y$, and $T_Z$) of the translation deviation, and accordingly determine the translation deviation.

In some cases, due to factors such as lens manufacturing errors or interface errors with the charge-coupled device (CCD), there may be an error associated with an actual optical center. Accordingly, the processing device 110 may correct the initial optical center coordinates.

In some embodiments, the processing device 110 may predict a deviation value and a deviation direction of the optical center through an optical center deviation prediction model, and correct the initial optical center coordinates based on the deviation value and the deviation direction. For example, the processing device 110 may correct the initial optical center coordinates according to formula (15) and formula (16) below:

$$u_0' = u_0 \pm a \tag{15}$$

$$v_0' = v_0 \pm b \tag{16}$$

where $u'_0$ and $v'_0$ represent corrected coordinates of the lens optical center; a and b represent the deviation values; +a or +b means adding a or b to the initial coordinate (i.e., the deviation direction is negative); –a or –b means subtracting a or b from the initial coordinate (i.e., the deviation direction is positive).

In some embodiments, the optical center deviation prediction model may include a machine learning model, for example, a neural network model. For example, the neural network model may include a multi-layer perceptron (MLP) model, a deep neural network (DNN) model, a convolutional neural network (CNN) model, a deep convolutional encoder-decoder (DCED) network model, a generative adversarial network (GAN) model, or the like, or any combination thereof.

In some embodiments, the optical center deviation prediction model may be obtained through training based on a plurality of second training samples. In some embodiments, the second training sample may include sample initial optical center coordinates of multiple images captured by the capture device. A corresponding second label may include a deviation value and a deviation direction between actual optical center coordinates and the sample initial optical center coordinates.

In some embodiments, the optical center deviation prediction model may be trained iteratively until a termination condition is satisfied. In response to that the termination condition is satisfied, the optical center deviation prediction model may be finalized. In some embodiments, the termination condition may relate to a value of a loss function. For example, the termination condition may be deemed satisfied if the value of the loss function is minimal or smaller than a predetermined threshold. As another example, the termination condition may be deemed satisfied if the value of the loss function converges. In some embodiments, "convergence" may refer to that the variation of the values of the loss function in two or more consecutive iterations is equal to or smaller than a predetermined threshold. In some embodiments, “convergence” may refer to that a difference between the value of the loss function and a target value is equal to or smaller than a predetermined threshold. In some embodiments, the termination condition may be deemed satisfied when a specified count of iterations have been performed in the training process.

According to some embodiments of the present disclosure, a solution model is established to solve the deviation information by using the geographic position information and the image position information of the geographic reference points, the installation information of the capture device, the reference PTZ attitude information, and the device information of the capture device. Accordingly, various spatial position and angle information of the capture device are used, which can provide data basis for subsequent target positioning process and improve the positioning efficiency and accuracy.

It should be noted that the above description is merely provided for the purposes of illustration, and not intended to limit the scope of the present disclosure. For persons having ordinary skills in the art, plurality of variations or modifications may be made under the teachings of the present disclosure. However, those variations and modifications do not depart from the scope of the present disclosure.

Figure 9:
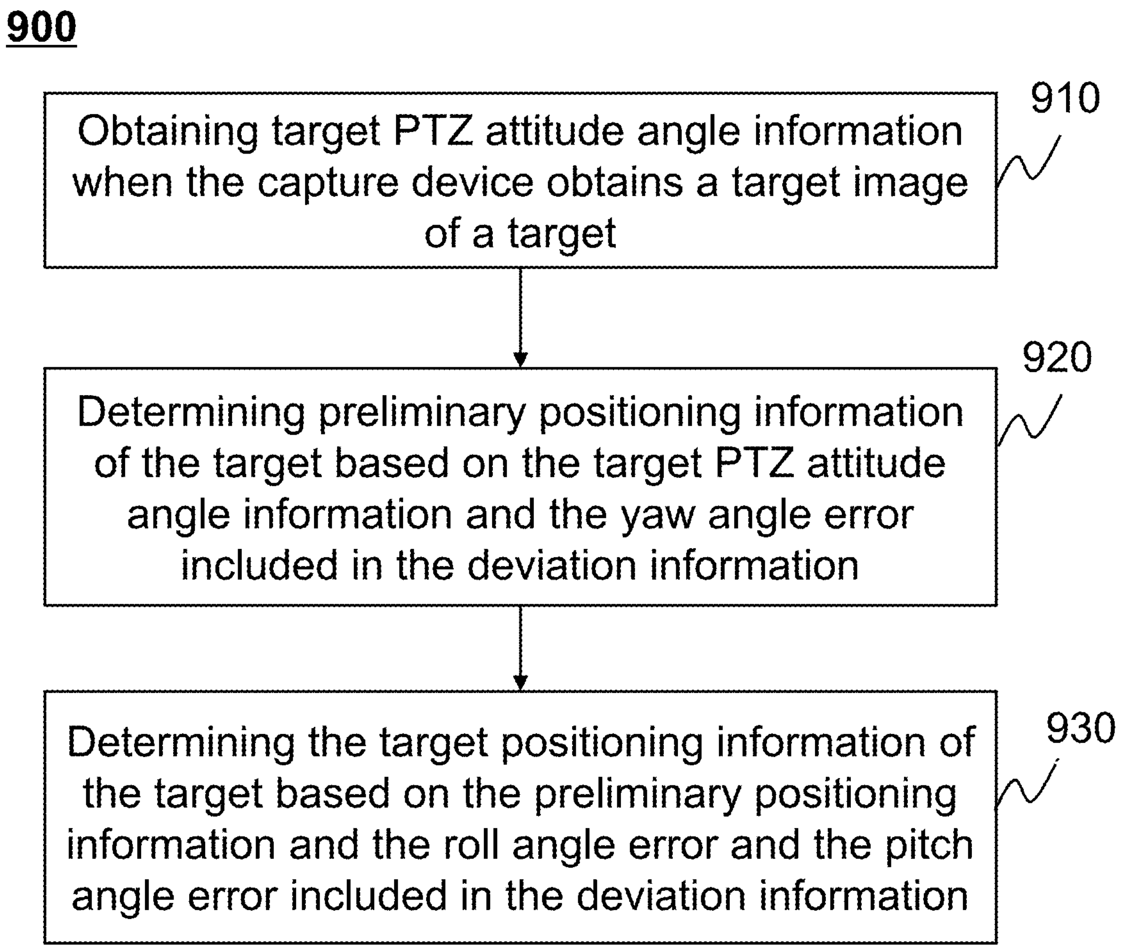
FIG. 9 is a flowchart illustrating an exemplary process for determining target positioning information of a target according to some embodiments of the present disclosure.

FIG. 9 is a flowchart illustrating an exemplary process for determining target positioning information of a target according to some embodiments of the present disclosure. In some embodiments, process 900 may be executed by the positioning deviation correction system 100. For example, the process 900 may be implemented as a set of instructions stored in the storage device (e.g., the storage device 120). In some embodiments, the processing device 110 (e.g., the processor 220 of the computing device 200 and/or one or more modules illustrated in FIG. 3) may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In some embodiments, when a target monitoring scene is being monitored, the capture device may capture image(s) of the target monitoring scene and the captured image(s) may be analyzed to determine whether there is a target (e.g., a fire point) of interest. After it is determined that there is a target of interest in the target scene, preliminary positioning information of the target may be determined; then the deviation information may be used to correct the preliminary positioning information to obtain target positioning information, which can improve the positioning accuracy.

In 910, the processing device 110 (e.g., the correction module 330, the processor 220) may obtain target PTZ attitude information when the capture device captures a target image of a target.

The target may refer to an object that needs to be monitored and/or located. For example, the target may be a position (e.g., a fire point) in a forest. As another example, the target may be a suspect or a missing person.

The target PTZ attitude information may refer to PTZ attitude information when the capture device performs a capture operation on the target. In some embodiments, the target PTZ attitude information may include a target PTZ yaw angle and a target PTZ pitch angle.

In some embodiments, the processing device 110 may record an angle (e.g., the PTZ pitch angle and the PTZ yaw angle) of the PTZ when the capture device performs a capture operation on the target and accordingly obtain the target PTZ attitude information. In some embodiments, the target PTZ attitude information may be expressed as $R_{YT}(pitch_{YT}, yaw_{YT})$, wherein $pitch_{YT}$ represents the target PTZ pitch angle and $yaw_{YT}$ represents the target PTZ yaw angle.

In 920, the processing device 110 (e.g., the correction module 330, the processor 220) may determine preliminary positioning information of the target based on the target PTZ attitude information and the yaw angle error included in the deviation information.

In some embodiments, the processing device 110 may determine compensated target PTZ attitude information based on the yaw angle error. For example, the processing device 110 may determine a compensated target PTZ yaw angle according to formula (17) below:

$$yaw'_{YT} = yaw_{YT} + yaw \tag{17}$$

where $yaw'_{YT}$ represents the compensated target PTZ yaw angle, $yaw_{YT}$ represents the target PTZ yaw angle (also referred to as an initial target PTZ yaw angle), and yaw represents the yaw angle error.

Further, the processing device 110 may determine the preliminary positioning information of the target based on the compensated target PTZ attitude information. In some embodiments, the processing device 110 may determine the preliminary positioning information of the target based on the device positioning information, the compensated target PTZ attitude information, and a horizontal distance between a position of the capture device and a position of the target.

Figure 11:
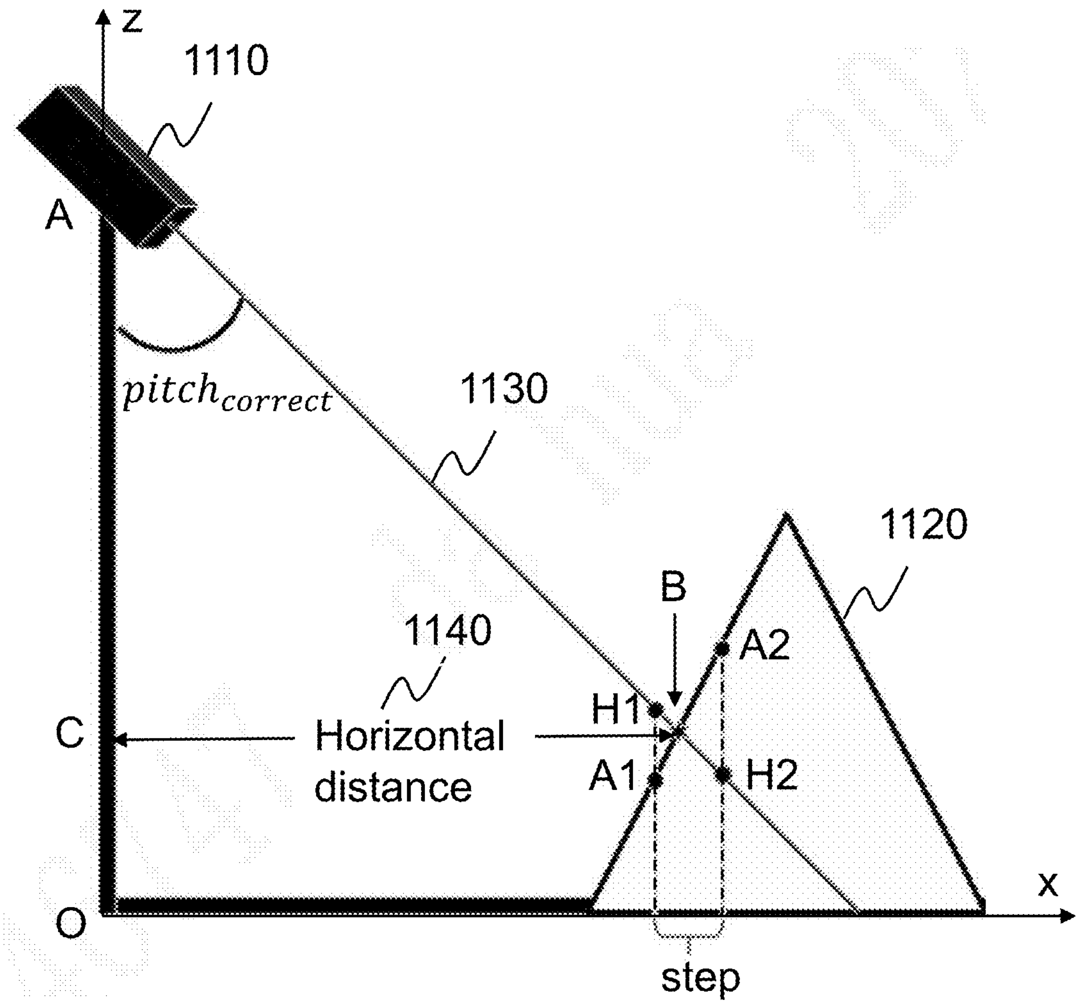
FIG. 11 is a schematic diagram illustrating an exemplary process for determining target positioning information of a target according to some embodiments of the present disclosure.

Merely by way of example, the processing device 110 may determine a ray based on a position A (e.g., an installation position) of the capture device, the target PTZ pitch angle, and the compensated target PTZ yaw angle. Further, for a triangle ABC formed by the position A of the capture device, a position B of the target, and a point C (which is an intersection of the horizontal distance between the capture device and the target and the z-axis as shown in FIG. 11), the processing device 110 may determine a degree of ∠ABC based on a degree of ∠BAC (e.g., the target PTZ pitch angle) and ∠ACB (which is 90°). Furthermore, for the triangle ABC, a length of side BC is equal to the horizontal distance, a length of side AC is a vertical distance between the capture device and the target. Accordingly, the processing device 110 may determine the preliminary positioning information of the target (e.g., coordinates of the position B) based on the degree of ∠ABC and the horizontal distance.

In some embodiments, the preliminary positioning information may include longitude information, latitude information, and altitude information. For example, the preliminary positioning information may be expressed as $(long_{target}, lat_{target}, alti_{target})$.

In 930, the processing device 110 (e.g., the correction module 330, the processor 220) may determine target positioning information of the target based on the preliminary positioning information and the roll angle error and the pitch angle error included in the deviation information.

In some embodiments, the processing device 110 may perform a coordinate transformation operation on the preliminary positioning information; obtain corrected positioning information by correcting the transformed preliminary positioning information based on the roll angle error and the pitch angle error; and obtain the target positioning information of the target by performing an inverse transformation operation on the corrected positioning information.

In some embodiments, the processing device 110 may perform the transformation operation on the preliminary positioning information to convert the preliminary positioning information into transformed preliminary positioning information under the geocentric coordinate system.

Further, the processing device 110 may determine a target deviation matrix (e.g., according to formula (6)) based on the roll angle error and the pitch angle error, and determine the corrected positioning information by correcting the transformed preliminary positioning information based on the target deviation matrix. For example, the processing device 110 may determine the corrected positioning information according to formula (18) below:

$$\begin{bmatrix} X \\ y \\ Z \end{bmatrix} = R'_{camera} * \begin{bmatrix} X_{target} \\ Y_{target} \\ Z_{target} \end{bmatrix} \tag{18}$$

where $R'_{camera}$ represents the target deviation matrix;

$$\begin{bmatrix} X_{target} \\ Y_{target} \\ Z_{target} \end{bmatrix}$$

represents the transformed preliminary positioning information; and $$\begin{bmatrix} X \\ Y \\ Z \end{bmatrix}$$

represents the corrected positioning information.

Furthermore, the processing device 110 may perform an inverse transformation operation on the corrected positioning information to determine the target positioning information. As used herein, the "inverse transformation operation" refers to transforming the corrected positioning information to corresponding information (i.e., the target positioning information) expressed in longitude-latitude-altitude manner.

According to some embodiments of the present disclosure, the deviation information (e.g., the yaw angle error, the roll angle error, the pitch angle error) of the capture device is used to correct the preliminary positioning information of the target to determine accurate target positioning information. Since as long as the installation position of the PTZ is fixed, an angle compensation relationship is fixed, the deviation information can be used to correct the positioning information of the target no matter the capture device is slightly tilted in any direction, thereby improving the positioning accuracy and efficiency.

It should be noted that the above description is merely provided for the purposes of illustration, and not intended to limit the scope of the present disclosure. For persons having ordinary skills in the art, plurality of variations or modifications may be made under the teachings of the present disclosure. However, those variations and modifications do not depart from the scope of the present disclosure.

Figure 10:
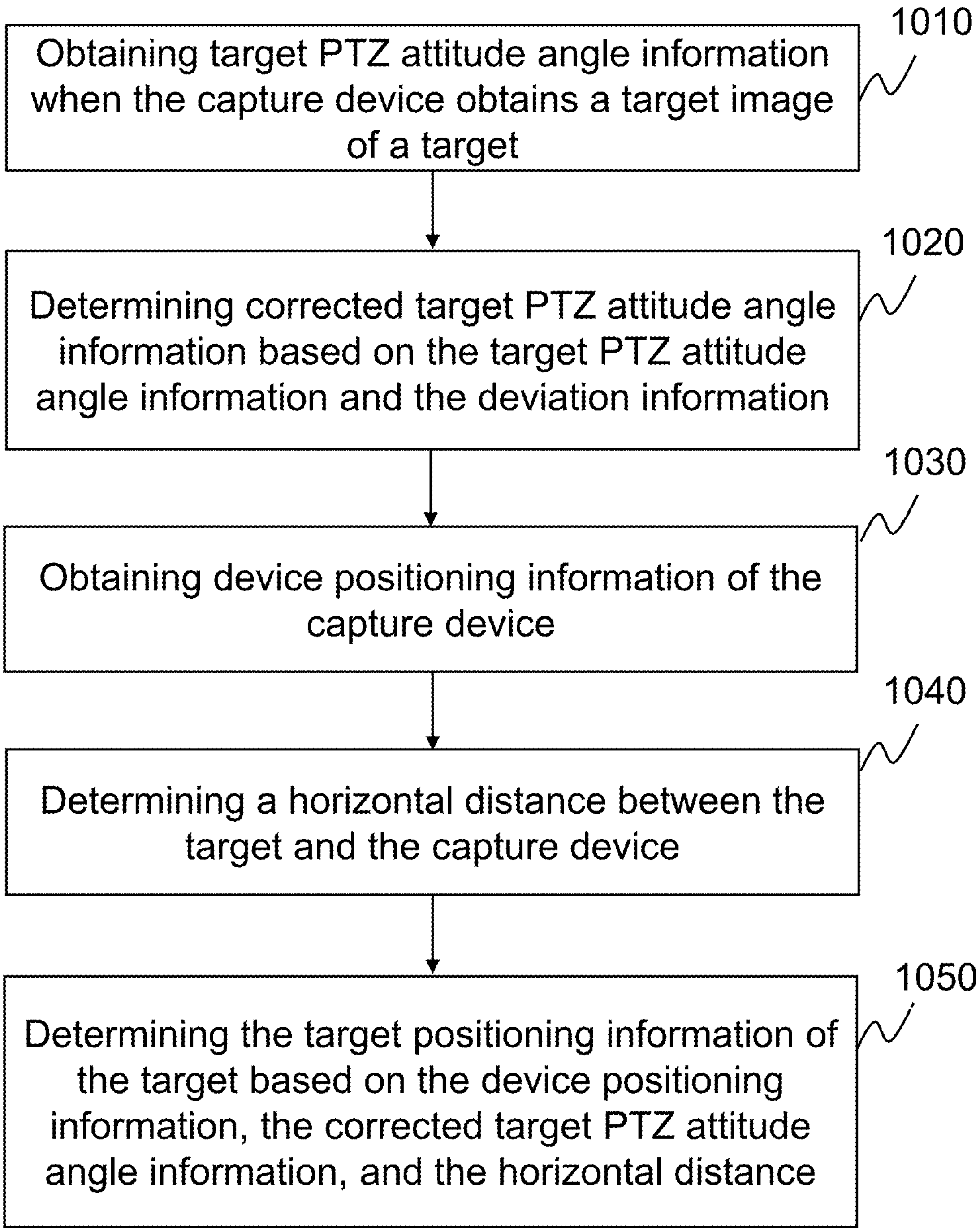
FIG. 10 is a flowchart illustrating an exemplary process for determining target positioning information of a target according to other embodiments of the present disclosure.

FIG. 10 is a flowchart illustrating an exemplary process for determining target positioning information of a target according to other embodiments of the present disclosure. In some embodiments, process 1000 may be executed by the positioning deviation correction system 100. For example, the process 1000 may be implemented as a set of instructions stored in the storage device (e.g., the storage device 120). In some embodiments, the processing device 110 (e.g., the processor 220 of the computing device 200 and/or one or more modules illustrated in FIG. 3) may execute the set of instructions and may accordingly be directed to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting.

In 1010, the processing device 110 (e.g., the correction module 330, the processor 220) may obtain target PTZ attitude information when the capture device captures a target image of the target. More descriptions may be found in operation 910 and the descriptions thereof are not repeated here.

In 1020, the processing device 110 (e.g., the correction module 330, the processor 220) may determine corrected target PTZ attitude information based on the target PTZ attitude information and the deviation information.

In some embodiments, the processing device 110 may correct the target PTZ yaw angle in the target PTZ attitude information based on the yaw angle error in the deviation information according to formula (19) below:

$$\text{yaw}_{correct} = \text{yaw}_{YT} + \text{yaw} \tag{19}$$

where $\text{yaw}_{correct}$ represents the corrected target PTZ yaw angle; $\text{yaw}_{YT}$ represents the target PTZ yaw angle in the target PTZ attitude information, and yaw represents the yaw angle error in the deviation information.

In some embodiments, the processing device 110 may correct the target PTZ pitch angle in the target PTZ attitude information based on the pitch angle error in the deviation information according to formula (20) below:

$$\text{pitch}_{correct} = \text{pitch}_{YT} + \text{pitch} \tag{20}$$

where $\text{pitch}_{correct}$ represents the corrected target PTZ pitch angle in the target PTZ attitude angle information, $\text{pitch}_{YT}$ represents the target PTZ pitch angle, pitch represents the pitch angle error in the deviation information.

In 1030, the processing device 110 (e.g., the correction module 330, processor 220) may obtain device positioning information of the capture device.

In some embodiments, the processing device 110 may obtain the device positioning information of the capture device through the positioning device 150 (e.g., a handheld locating device, a handheld locator, a mobile device). For example, after the installation of the capture device is completed, the processing device 110 may obtain the device positioning information of the capture device through the positioning device 150 provided with the capture device. In some embodiments, the device positioning information of the capture device may include longitude information, latitude information, and altitude information of a position (e.g., an installation position) of the capture device, wherein the altitude information is a sum of an altitude of a position where the capture device is located and a height of the capture device.

In 1040, the processing device 110 (e.g., the calibration module 330, the processor 220) may determine a horizontal distance between the target and the capture device.

The horizontal distance may refer to a horizontal distance (e.g., a horizontal distance 1140 illustrated in FIG. 11) between a position of the capture device and a position of the target. In some embodiments, the processing device 110 may establish a three-dimensional rectangular coordinate system of a space where the capture device is installed. For example, as shown in FIG. 11, for the coordinate system, a z axis is a direction along an altitude direction of the capture device from bottom to top, an x axis is a direction along a horizontal direction from the position of the capture device to the position of the target, an origin O is an intersection of the z axis and the x axis, and a y axis is not shown. Further, the processing device 110 may determine the horizontal distance between the target and the capture device based on the three-dimensional rectangular coordinate system.

In some embodiments, as illustrated in FIG. 11, a calculation process or a determination process may be performed by moving along the horizontal direction (e.g., the x-axis direction illustrated in FIG. 11) from the origin O according to a preset step length and stop moving until a preset condition is met. Accordingly, an intersection (i.e., a position of the target) of a ray 1130 starting from the optical center of the capture device 1110 to the target and a three-dimensional area (e.g., a mountain 1120) where the target is located can be determined.

In some embodiments, the preset step length may be set manually or may be a default value of the positioning deviation correction system 100, for example, the preset step length may be 1 meter, 2 meters, 3 meters, etc. The smaller the step length is, the higher the positioning accuracy may be.

In some embodiments, the preset condition may include $(H1-A1)*(H2-A2)<0$. As used herein, A1 and A2 respectively represent altitudes of mountain positions at two ends of the preset step when the moving process reaches the position of the mountain 1120; H1 and H2 respectively represent altitudes of ray points at the two ends of the preset step when the moving process reaches the position of the mountain 1120.

In some embodiments, when the preset condition is satisfied, the processing device 110 may determine the horizontal distance based on the preset step size and a number count of moving steps. For example, the processing device 110 may determine the horizontal distance 1140 by multiplying the preset step size by the number count of moving steps.

In 1050, the processing device 110 (e.g., the correction module 330, the processor 220) may determine the target positioning information of the target based on the device positioning information, the corrected target PTZ attitude information, and the horizontal distance.

Merely by way of example, as shown in FIG. 11, the processing device 110 may determine the ray 1130 based on a position A (e.g., an installation position) of the capture device, the corrected target PTZ pitch angle, and the corrected target PTZ yaw angle. Further, for a triangle ABC formed by the position A of the capture device, a position B of the target, and a point C (which is an intersection of the horizontal distance 1140 between the capture device and the target and the z-axis), the processing device 110 may determine a degree of ∠ABC based on a degree of ∠BAC (e.g., the corrected target PTZ pitch angle) and ∠ACB (which is 90°). Furthermore, for the triangle ABC, a length of side BC is equal to the horizontal distance 1140, a length of side AC is a vertical distance between the capture device and the target. Accordingly, the processing device 110 may determine coordinates of the position B of the target based on the degree of ∠ABC and the horizontal distance 1140.

According to some embodiments of the present disclosure, a horizontal distance between the capture device and the target may be determined based on a preset step length, and then target positioning information of the target may be determined by combining the corrected target PTZ attitude information and the device positioning information of the capture device, which can effectively solve a problem of locating the target difficultly when the capture device is a monocular camera and improve the positioning accuracy.

It should be noted that the above description is merely provided for the purposes of illustration, and not intended to limit the scope of the present disclosure. For persons having ordinary skills in the art, plurality of variations or modifications may be made under the teachings of the present disclosure. However, those variations and modifications do not depart from the scope of the present disclosure.

Figure 12:
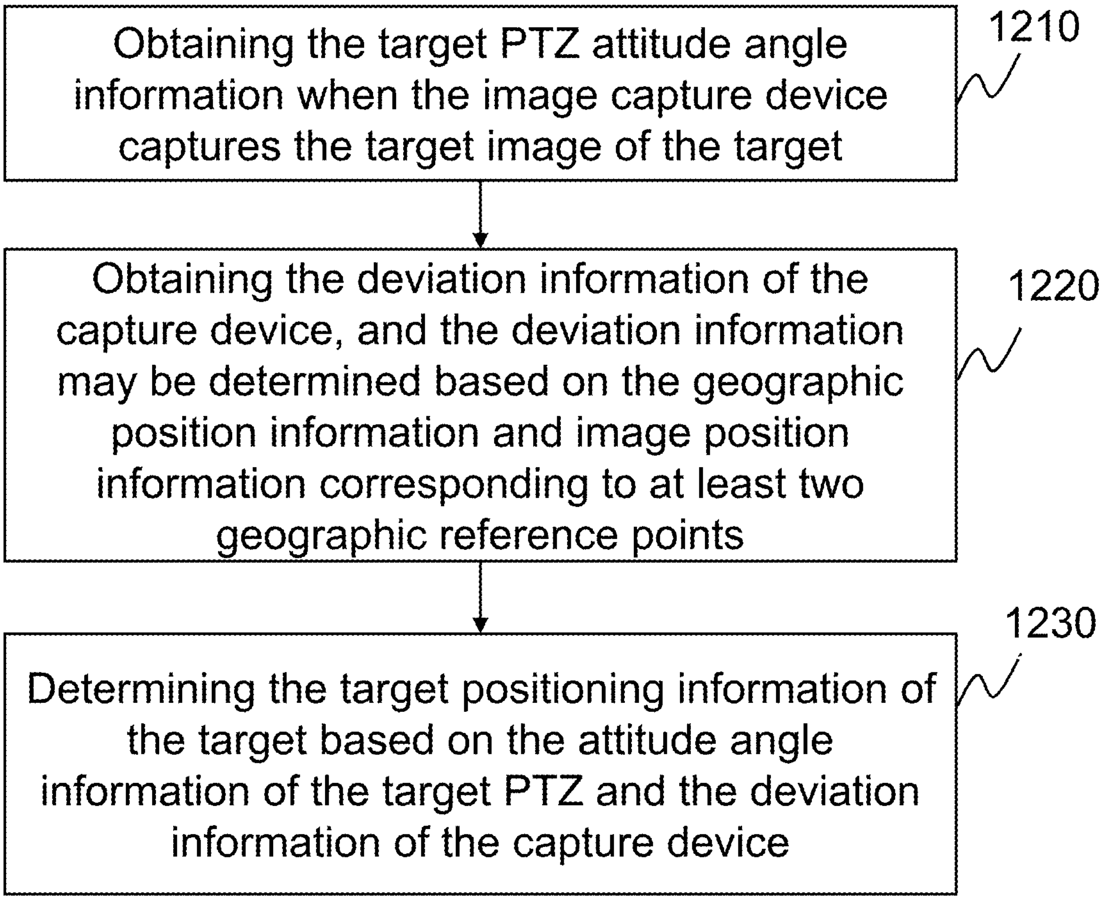
FIG. 12 is a flowchart illustrating an exemplary process for determining target positioning information of a target according to some embodiments of the present disclosure.

FIG. 12 is a flowchart illustrating an exemplary process for determining target positioning information of a target according to some embodiments of the present disclosure. In some embodiments, process 1200 may be executed by the positioning deviation correction system 100. For example, the process 1200 may be implemented as a set of instructions stored in the storage device (e.g., the storage device 120). In some embodiments, the processing device 110 (e.g., the processor 220 of the computing device 200 and/or one or more modules illustrated in FIG. 3) may execute the set of instructions and may accordingly be directed to perform the process 1200. The operations of the illustrated process presented below are intended to be illustrative. In some embodiments, the process 1200 may be accomplished with one or more additional operations not described and/or without one or more of the operations discussed. Additionally, the order of the operations of process 1200 illustrated in FIG. 12 and described below is not intended to be limiting.

In 1210, the processing device 110 (e.g., the processor 220) may obtain target PTZ attitude information when the capture device captures a target image of a target. More descriptions may be found in operation 910 and the descriptions thereof are not repeated here.

In 1220, the processing device 110 (e.g., the processor 220) may obtain deviation information of the capture device. In some embodiments, the deviation information may be determined based on geographic position information and image position information corresponding to at least two geographic reference points. More descriptions may be found elsewhere in the present disclosure (e.g., FIGS. 4-8 and the descriptions thereof) and the descriptions are not repeated here.

In 1230, the processing device 110 (e.g., the processor 220) may determine target positioning information of the target based on target PTZ attitude information and the deviation information of the capture device. More descriptions may be found elsewhere in the present disclosure (e.g., FIG. 9, FIG. 10, and the descriptions thereof) and the descriptions are not repeated here.

It should be noted that the above description is merely provided for the purposes of illustration, and not intended to limit the scope of the present disclosure. For persons having ordinary skills in the art, plurality of variations or modifications may be made under the teachings of the present disclosure. However, those variations and modifications do not depart from the scope of the present disclosure.

Some embodiments of the present disclosure provide a system for correcting positioning deviation. The system may include at least one storage device for storing instructions and at least one processing device connected to the at least one storage device. When executing the instructions, the at least one processing device may implement the process or method (e.g., process 400, process 600, process 800, process 900, process 1000, process 1200) disclosed elsewhere in the present disclosure.

Some embodiments of the present disclosure provide a non-transitory computer-readable storage medium. The storage medium stores computer instructions. When a computer reads the computer instructions in the storage medium, the computer may execute the process or method (e.g., process 400, process 600, process 800, process 900, process 1000, process 1200) disclosed elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for correcting positioning deviation, comprising:
- obtaining geographic position information of at least two geographic reference points;
- for each of the at least two geographic reference points, obtaining a reference image of the geographic reference point collected by a capture device, wherein the reference image includes image position information of an image reference point corresponding to the geographic reference point;
- for each of the at least two geographic reference points, obtaining reference Pan-Tilt-zoom (PTZ) attitude information corresponding to the reference image, wherein the reference PTZ attitude information includes a reference PTZ pitch angle and a reference PTZ yaw angle when the capture device captures the reference image;
- constructing a geographic position matrix based on the geographic position information;
- constructing an image position matrix based on the image position information;
- constructing a PTZ rotation matrix based on the reference PTZ attitude information; and
- determining deviation information of the capture device based on the geographic position matrix, the image position matrix, and the PTZ rotation matrix.

2. The method of claim 1, wherein when the capture device captures the reference image of the geographic reference point, the image reference point corresponding to the geographic reference point is located at a center of a capture view of the capture device.

3. The method of claim 1, wherein the deviation information includes at least one of an angular deviation or a translational deviation.

4. The method of claim 1, wherein the determining the deviation information of the capture device based on the geographic position matrix, the image position matrix, and the PTZ rotation matrix comprises:
- constructing the PTZ rotation matrix based on the PTZ attitude information and a part of the deviation information;
- constructing a deviation matrix corresponding to the deviation information; and
- solving the deviation information based on the geographic position matrix, the image position matrix, the PTZ rotation matrix, and the deviation matrix, wherein the deviation information at least includes an angular deviation, the angular deviation including a yaw angle error, a roll angle error, and a pitch angle error.

5. The method of claim 1, further comprising:
- obtaining target PTZ attitude information when the capture device captures a target image of a target; and
- determining target positioning information of the target based on the target PTZ attitude information and the deviation information of the capture device.

6. The method of claim 5, wherein the determining target positioning information of the target based on the target PTZ attitude information and the deviation information of the capture device includes:
- determining preliminary positioning information of the target based on the target PTZ attitude information and a yaw angle error included in the deviation information; and
- determining the target positioning information of the target based on the preliminary positioning information and a roll angle error and a pitch angle error included in the deviation information.

7. The method of claim 6, wherein the determining the target positioning information of the target based on the preliminary positioning information and the roll angle error and the pitch angle error included in the deviation information comprises:
- performing a coordinate transformation operation on the preliminary positioning information;
- obtaining corrected positioning information by correcting the transformed preliminary positioning information based on the roll angle error and the pitch angle error; and
- obtaining the target positioning information of the target by performing an inverse transformation operation on the corrected positioning information.

8. The method of claim 5, wherein the determining target positioning information of the target based on the target PTZ attitude information and the deviation information of the capture device includes:
- determining corrected target PTZ attitude information based on the target PTZ attitude information and the deviation information;
- obtaining device positioning information of the capture device;
- determining a horizontal distance between the target and the capture device; and
- determining the target positioning information of the target based on the device positioning information, the corrected target PTZ attitude information, and the horizontal distance.

9. A system for correcting positioning deviation, comprising:
- at least one storage device storing instructions;
- at least one processing device in communication with the at least one storage device, wherein when executing the instructions, the at least one processing device is configured to perform operations including:
  - obtaining geographic position information of at least two geographic reference points;

for each of the at least two geographic reference points, obtaining a reference image of the geographic reference point collected by a capture device, wherein the reference image includes image position information of an image reference point corresponding to the geographic reference point;

for each of the at least two geographic reference points, obtain reference Pan-Tilt-zoom (PTZ) attitude information corresponding to the reference image, wherein the reference PTZ attitude information includes a reference PTZ pitch angle and a reference PTZ yaw angle when the capture device captures the reference image;

construct a geographic position matrix based on the geographic position information;

construct an image position matrix based on the image position information;

construct a PTZ rotation matrix based at least in part on the reference PTZ attitude information; and determine deviation information of the capture device based on the geographic position matrix, the image position matrix, and the PTZ rotation matrix.

10. The system of claim 9, wherein when the capture device captures the reference image of the geographic reference point, the image reference point corresponding to the geographic reference point is located at a center of a capture view of the capture device.

11. The system of claim 9, wherein the deviation information includes at least one of an angular deviation or a translational deviation.

12. The system of claim 9, wherein for determining the deviation information of the capture device based on the geographic position matrix, the image position matrix, and the PTZ rotation matrix, the at least one processing device is further configured to perform operations including:

constructing the PTZ rotation matrix based on the PTZ attitude information and a part of the deviation information;

constructing a deviation matrix corresponding to the deviation information; and solving the deviation information based on the geographic position matrix, the image position matrix, the PTZ rotation matrix, and the deviation matrix, wherein the deviation information at least includes an angular deviation, the angular deviation including a yaw angle error, a roll angle error, and a pitch angle error.

13. The system of claim 9, wherein the at least one processing device is further configured to perform operations including:

obtaining target PTZ attitude information when the capture device captures a target image of a target; and determining target positioning information of the target based on the target PTZ attitude information and the deviation information of the capture device.

14. The system of claim 13, wherein for determining target positioning information of the target based on the target PTZ attitude information and the deviation information of the capture device, the at least one processing device is further configured to perform operations including:

determining preliminary positioning information of the target based on the target PTZ attitude information and a yaw angle error included in the deviation information; and determining the target positioning information of the target based on the preliminary positioning information and a roll angle error and a pitch angle error included in the deviation information.

15. The system of claim 13, wherein for determining target positioning information of the target based on the target PTZ attitude information and the deviation information of the capture device, the at least one processing device is further configured to perform operations including:

determining corrected target PTZ attitude information based on the target PTZ attitude information and the deviation information;

obtaining device positioning information of the capture device;

determining a horizontal distance between the target and the capture device; and determining the target positioning information of the target based on the device positioning information, the corrected target PTZ attitude information, and the horizontal distance.

16. A positioning method, comprising:

obtaining target PTZ attitude information when a capture device captures a target image of a target;

obtaining deviation information of the capture device, including:

for each of the at least two geographic reference points, obtaining reference Pan-Tilt-zoom (PTZ) attitude information corresponding to the reference image, wherein the reference PTZ attitude information includes a reference PTZ pitch angle and a reference PTZ yaw angle when the capture device captures the reference image;

constructing a geographic position matrix based on the geographic position information;

constructing an image position matrix based on the image position information;

constructing a PTZ rotation matrix based at least in part on the reference PTZ attitude information; and determining the deviation information of the capture device based on the geographic position matrix, the image position matrix, and the PTZ rotation matrix.

* * * * *